(12) United States Patent
Adler et al.

(10) Patent No.: US 11,488,187 B1
(45) Date of Patent: Nov. 1, 2022

(54) MANAGING OPERATIONS OF MOBILE RETAIL UNITS

(71) Applicant: SANTA ISRAEL LTD., Tel Aviv (IL)

(72) Inventors: Roee Adler, Tel Aviv (IL); Menachem Katz, Seattle, WA (US); Shai Wininger, Kerem Maharal (IL); Uri Meidan, Brooklyn, NY (US); May Walter, Tel Aviv (IL)

(73) Assignee: SANTA ISRAEL LTD., Tei Aviv (IL)

( * ) Notice: Subject to any disclaimer, the term of this patent is extended or adjusted under 35 U.S.C. 154(b) by 0 days.

(21) Appl. No.: 17/717,376

(22) Filed: Apr. 11, 2022

(51) Int. Cl.
  *G06Q 10/00* (2012.01)
  *G06Q 30/02* (2012.01)
  *G06Q 10/08* (2012.01)

(52) U.S. Cl.
  CPC ....... *G06Q 30/0205* (2013.01); *G06Q 10/087* (2013.01)

(58) Field of Classification Search
  None
  See application file for complete search history.

(56) References Cited

U.S. PATENT DOCUMENTS

| | | | | |
|---|---|---|---|---|
| 7,376,584 | B1 * | 5/2008 | Weixel | G06Q 20/204 705/26.1 |
| 9,152,971 | B2 * | 10/2015 | Akin | G06Q 30/02 |
| 9,269,103 | B1 * | 2/2016 | Kumar | H04W 4/80 |
| 10,410,272 | B1 * | 9/2019 | Johnson | G06Q 30/0633 |
| 10,535,256 | B1 * | 1/2020 | Lim | G08G 1/096811 |
| 10,949,796 | B1 * | 3/2021 | Tsou | G06Q 10/087 |
| 2005/0010472 | A1 * | 1/2005 | Quatse | G06Q 30/0211 705/14.13 |
| 2006/0242154 | A1 * | 10/2006 | Rawat | G06F 16/168 |
| 2007/0219706 | A1 * | 9/2007 | Sheynblat | G01C 21/3679 701/532 |
| 2008/0040281 | A1 * | 2/2008 | Chakraborty | H04M 3/42348 705/52 |
| 2008/0154706 | A1 * | 6/2008 | Bruecken | G06Q 30/0239 705/14.58 |
| 2009/0079586 | A1 * | 3/2009 | Bespalov | G08G 1/0104 340/905 |
| 2011/0040655 | A1 * | 2/2011 | Hendrickson | H04L 67/52 705/26.1 |

(Continued)

OTHER PUBLICATIONS

Cheng-Lung Wu (Inherent delays and operational reliability of airline schedules, Journal of Air Transport Management 11 (2005) 273-28). (Year: 2005).*

*Primary Examiner* — Hafiz A Kassim

(57) ABSTRACT

A method, apparatus and product including: assigning geographical zones to a mobile retail unit based on first user segments of customers from the geographical zones and based on second user segments associated to an inventory of the mobile retail unit; based on the mobile retail unit being located at a location in the geographical zones, detecting a first group of customers within a first distance threshold from the location; sending a first set of order invitations to the first group of customers; determining to adjust the first distance threshold based on a delay probability; based on said determining, increasing the first distance threshold to a second distance threshold, wherein a second group of customers are detected within the second distance threshold; and sending a second set of order invitations to the second group of customers.

19 Claims, 5 Drawing Sheets

(56) References Cited

U.S. PATENT DOCUMENTS

| | | | |
|---|---|---|---|
| 2012/0036015 A1* | 2/2012 | Sheikh | G06Q 30/0267 705/14.57 |
| 2012/0059729 A1* | 3/2012 | Roa | G06Q 30/0601 705/26.1 |
| 2012/0158545 A1* | 6/2012 | Chen | G06Q 30/0623 705/26.61 |
| 2013/0027227 A1* | 1/2013 | Nordstrom | G01C 21/3438 340/990 |
| 2013/0132140 A1* | 5/2013 | Amin | G06Q 30/0284 705/7.13 |
| 2013/0197949 A1* | 8/2013 | Dermer | G06Q 10/02 705/5 |
| 2014/0164126 A1* | 6/2014 | Nicholas | A63F 9/24 705/14.58 |
| 2015/0161554 A1* | 6/2015 | Sweeney | G06Q 50/30 705/7.15 |
| 2015/0193819 A1* | 7/2015 | Chang | G06Q 30/0252 705/7.19 |
| 2016/0014220 A1* | 1/2016 | Kim | H04W 4/023 709/202 |
| 2016/0140589 A1* | 5/2016 | Deshpande | G06Q 30/0201 705/7.34 |
| 2016/0353235 A1* | 12/2016 | Williams | H04W 4/02 |
| 2016/0364823 A1* | 12/2016 | Cao | G01C 21/3438 |
| 2017/0193491 A1* | 7/2017 | Phipps | H04W 4/80 |
| 2017/0262784 A1* | 9/2017 | Lowery | G06Q 50/12 |
| 2017/0358022 A1* | 12/2017 | Deak | G06Q 30/0631 |
| 2018/0260883 A1* | 9/2018 | Iacono | G06Q 30/0641 |
| 2018/0285809 A1* | 10/2018 | Fredrich | G06Q 30/0202 |
| 2019/0180323 A1* | 6/2019 | Handel | G06Q 30/0207 |
| 2019/0205857 A1* | 7/2019 | Bell | G06Q 20/202 |
| 2020/0349632 A1* | 11/2020 | Xu | G06Q 50/12 |
| 2021/0019694 A1* | 1/2021 | Dhesi | G06Q 10/087 |
| 2021/0035196 A1* | 2/2021 | Resheff | G06Q 30/0639 |
| 2021/0192547 A1* | 6/2021 | Henderson | G06Q 50/01 |
| 2022/0036393 A1* | 2/2022 | Monroe | H04W 4/02 |

* cited by examiner

MANAGING OPERATIONS OF MOBILE RETAIL UNITS

TECHNICAL FIELD

The present disclosure relates to mobile retail units in general, and to managing routes and order invitations of mobile retail units, in particular.

BACKGROUND

A mobile retail unit, such as a retail truck, van, or the like, may include a mobile unit loaded with items for sale, which travels around offering items to customers. In some cases, retailers operating mobile retail units may offer consumer goods, final goods, services, commodities, or the like.

BRIEF SUMMARY

One exemplary embodiment of the disclosed subject matter is a method comprising: assigning one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones; based on the mobile retail unit being located at a location in the one or more geographical zones, detecting a first group of one or more customers within a first distance threshold from the location; sending a first set of one or more order invitations to the first group of one or more customers, wherein the first set of one or more order invitations invite the first group of one or more customers to book respective first set of one or more meetings, wherein during each booked meeting of the first set of one or more meetings, one or more items selected by a respective customer is presented to the respective customer; determining to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold; based on said determining, increasing the first distance threshold to a second distance threshold, wherein a second group of one or more customers are detected within the second distance threshold, wherein the first group of one or more customers excludes the second group of one or more customers; and sending a second set of one or more order invitations to the second group of one or more customers, wherein the second set of one or more order invitations invite the second group of one or more customers to book respective second set of one or more meetings.

Optionally, said assigning comprises estimating that a probability of engagement of the customers from the one or more geographical zones with order invitations associated with the inventory complies with an engagement optimization criterion and with a constraint on resources of the mobile retail unit.

Optionally, the first set of one or more order invitations comprises an order invitation that enables a customer to make an order comprising at least a portion of the items from the mobile retail unit, wherein, in response to making the order that comprises the at least the portion of the items, the method comprises scheduling a meeting with the customer, wherein the meeting is comprised by the first set of one or more meetings.

Optionally, the delay probability is determined based on ordering probabilities of the first group of one or more customers, wherein the ordering probabilities are determined based on measured reactions of the first group of one or more customers to the first set of one or more order invitations.

Optionally, the delay probability is determined based on predicted service times for serving customers from the first group of one or more customers that are estimated, by a prediction module, to make an order.

Optionally, the delay probability is determined based on predicted driving times for driving between customers from the first group of one or more customers that are estimated to make an order.

Optionally, the delay probability is determined based on historic conversion rates of customers in view of types of customer reactions.

Optionally, the method comprises dynamically performing a comparison between the probability that the first group of one or more customers will suffer from the one or more illegitimate delays and between a tolerance threshold, and determining to adjust the first distance threshold based on the comparison.

Optionally, in case the tolerance threshold is not complied with after starting to perform said sending the second set of one or more order invitations to the second group of one or more customers, the method comprises terminating said sending the second set of order invitations until the tolerance threshold is complied with.

Optionally, in case the tolerance threshold is complied with after sending the second set of one or more order invitations to the second group of one or more customers, the method comprises increasing the second distance threshold to a third distance threshold, thereby causing a third set of order invitations to be sent to a third group of one or more customers that are located within the third distance threshold from the mobile retail unit, wherein the first and second groups of one or more customers exclude the third group of one or more customers.

Optionally, said sending the second set of one or more order invitations comprises iteratively: sending an order invitation to a single customer from the second group of one or more customers, determining an adjusted delay probability that takes into account the single customer, and in case the adjusted delay probability complies with the tolerance threshold, inviting a next customer from the second group of one or more customers.

Optionally, the customers from the one or more geographical zones comprise customers that have an indicated address within the one or more geographical zones.

Optionally, an order invitation of the first set of one or more order invitations is expired after an elapsed timeframe.

Optionally, the method comprises causing an order invitation of the first set of one or more order invitations to become expired based on a driving route of the mobile retail unit, wherein the driving route is based on a comparison between ordering probabilities of the first group of one or more customers and a threshold.

Another exemplary embodiment of the disclosed subject matter is an apparatus comprising a processor and coupled memory, said processor being adapted to: assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones; based on the mobile retail unit being located at a location in the one or more geographical zones, detect a first group of one or more customers within a first distance threshold from the location; send a first set of one or more order invitations to the first group of one or more customers, wherein the first set of one or more order invitations invite the first group of one or more customers to book respective first set of one or more meetings, wherein during each booked meeting of the first set of one or more meetings, one or more items selected by a respective customer is presented to the respective customer; determine to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold; based on said determining, increase the first distance threshold to a second distance threshold, wherein a second group of one or more customers are detected within the second distance threshold, wherein the first group of one or more customers excludes the second group of one or more customers; and send a second set of one or more order invitations to the second group of one or more customers, wherein the second set of one or more order invitations invite the second group of one or more customers to book respective second set of one or more meetings.

Yet another exemplary embodiment of the disclosed subject matter is a computer program product comprising a non-transitory computer readable storage medium retaining program instructions, which program instructions, when read by a processor, cause the processor to: assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones; based on the mobile retail unit being located at a location in the one or more geographical zones, detect a first group of one or more customers within a first distance threshold from the location; send a first set of one or more order invitations to the first group of one or more customers, wherein the first set of one or more order invitations invite the first group of one or more customers to book respective first set of one or more meetings, wherein during each booked meeting of the first set of one or more meetings, one or more items selected by a respective customer is presented to the respective customer; determine to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold; based on said determining, increase the first distance threshold to a second distance threshold, wherein a second group of one or more customers are detected within the second distance threshold, wherein the first group of one or more customers excludes the second group of one or more customers; and send a second set of one or more order invitations to the second group of one or more customers, wherein the second set of one or more order invitations invite the second group of one or more customers to book respective second set of one or more meetings.

Yet another exemplary embodiment of the disclosed subject matter is system comprising a processor and coupled memory, the processor being adapted to: assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones; based on the mobile retail unit being located at a location in the one or more geographical zones, detect a first group of one or more customers within a first distance threshold from the location; send a first set of one or more order invitations to the first group of one or more customers, wherein the first set of one or more order invitations invite the first group of one or more customers to book respective first set of one or more meetings, wherein during each booked meeting of the first set of one or more meetings, one or more items selected by a respective customer is presented to the respective customer; determine to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold; based on said determining, increase the first distance threshold to a second distance threshold, wherein a second group of one or more customers are detected within the second distance threshold, wherein the first group of one or more customers excludes the second group of one or more customers; and send a second set of one or more order invitations to the second group of one or more customers, wherein the second set of one or more order invitations invite the second group of one or more customers to book respective second set of one or more meetings.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
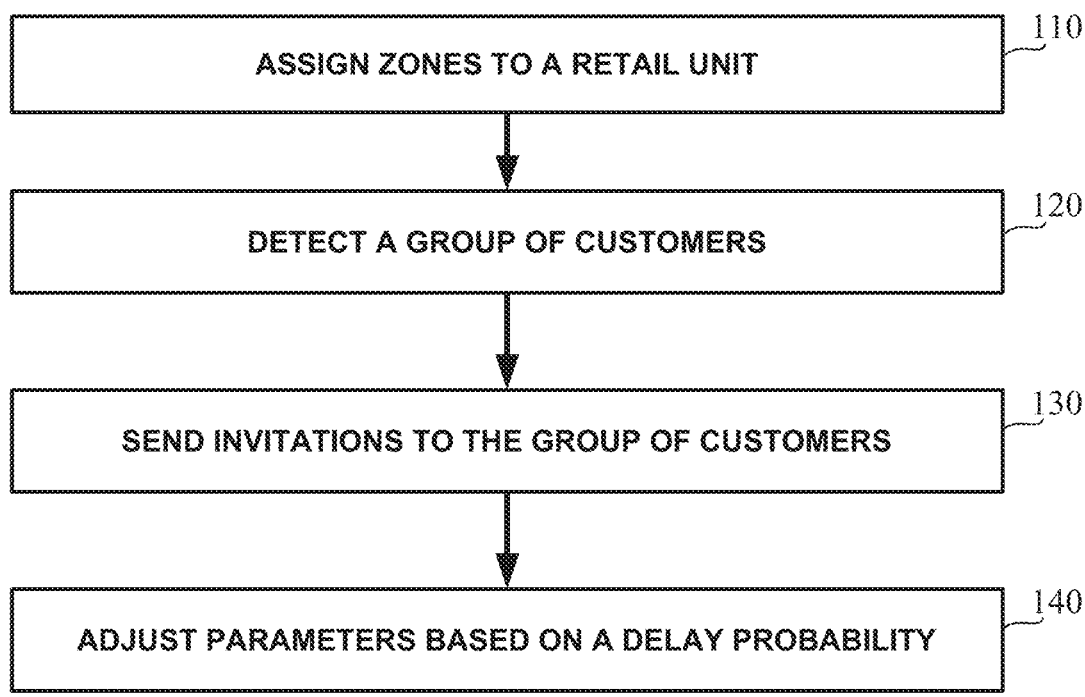
FIG. 1 shows a flowchart diagram of a method, in accordance with some exemplary embodiments of the disclosed subject matter.

One technical problem dealt with by the disclosed subject matter is to manage multiple mobile retail units, trucks, or the like, that are configured to provide products or services to customers privately. In some exemplary embodiments, a mobile retail unit may comprise a retail truck, a van, a trailer, a terrestrial vehicle, a maritime vehicle, an aerial vehicle, or the like. In some exemplary embodiments, an inventory of the retail unit may comprise merchandise, cargo, items, goods, materials, or the like, which may be stored within the mobile retail unit, such as in a designated cargo area. In some exemplary embodiments, one or more mobile retail units stocked with merchandise may be utilized for selling purposes. In some exemplary embodiments, mobile retail units may be loaded with items for sale, and may be driven though one or more geographical areas or zones, in which the items may be offered to customers.

In some cases, mobile retail units may offer items that are personal in nature, items that can be used during a trial period, or the like, which may be advantageously provided in private locations of customers. For example, in case of a retail truck that sells clothing items, the customers may wish to try on the items, verify that the items fit them, look flattering on them, or the like. In some exemplary embodiments, a mobile retail unit may be configured to arrive at customers' homes or other indicated addresses in order to provide the customers with private and convenient selling experiences. In some exemplary embodiments, customers in the immediate area of each retail unit may be notified of items that may be of interest to the customers, so that orders may be obtained in real time. In some exemplary embodiments, for each order, an appointment or meeting with an operator of the retail unit may be scheduled at a location of the ordering customer, referred to as a point of sale.

In some exemplary embodiments, the management and operation of mobile retail units presents multiple limitations and challenges, such as the limited available storage space in each mobile retail unit, limited time for driving and serving customers, limited areas that can be served by each mobile retail units, a limited number of customers that can be served by each mobile retail unit, or the like. In some exemplary embodiments, it may be desired to manage the operation of mobile retail units in a manner that increases a probability that customers will be interested in items from the inventory of the retail unit, decreases a waiting time of ordering customers for a meeting, and decreases cancellation of orders due to insufficient time, being out of stock of ordered items, moving on to a next area, or the like. These objectives may be desirable for maximizing revenue while maintaining customer loyalty.

Another technical problem dealt with by the disclosed subject matter is to schedule or assign, for each mobile retail unit, one or more areas with customers that have a high probability of keeping or purchasing items from the mobile retail unit. In some exemplary embodiments, managing the mobile retail unit may include scheduling the mobile retail unit to serve one or more geographical areas or zones each day, each shift, each defined timeframe, or the like, and notifying selected customers from the area about available items in real time, such that customers living in the area can expect or order a private visit from the mobile retail unit a short time after ordering. In some exemplary embodiments, it may be desired to select areas for a mobile retail unit in a manner that reduces a waiting time of the customers to the retail unit while increasing the engagement and revenue from the customers.

Yet another technical problem dealt with by the disclosed subject matter is selecting a service area for a mobile retail unit, that is not configured to overload the mobile retail unit. As the mobile retail unit may have resource limitations, it may be desired that the service area selected for the mobile retail unit matches the available resources of the mobile retail unit. For example, it may be desired that a mobile retail unit will not serve an area with too many customers that are all interested in keeping items, as the time and cargo may not be sufficient for this number of orders. As another example, it may be desired that a mobile retail unit will not serve an area that is too large and cannot be traveled to during the serving time of the retail unit.

Yet another technical problem dealt with by the disclosed subject matter is to determine which customers, in which geographical areas, may be provided with appointment invitations (also referred to as 'order invitations') associated with the retail unit. In some exemplary embodiments, an appointment invitation to a customer may comprise a suggestion of one or more items from the retail unit, a link to a retailer site or application that offers items from the retail unit to the customer, a suggestion of an appointment with the operator, or the like, which may be provided to customers via a push notification, an alert, a message, or the like. It may be desired to select, in real time, customers for providing thereto appointment invitations in a manner that maximizes an estimated engagement, an estimated number of appointments, an estimated revenue, or the like, while minimizing a waiting time of the customers and a probability that customers will order items that are out of stock, or that the retail unit will not have time to serve them.

Yet another technical problem dealt with by the disclosed subject matter is scheduling a route between remote customer zones, detached concentrations of customers, remote concentrations of customers, or the like. For example, a retailer may start to operate in a new city with a small number of registered customers, that may be located in remote neighborhoods of the city. In some exemplary embodiments, a few concentrations of customers that are relatively far from each other (e.g., above a threshold) may be detected, without enabling to derive a clear or natural route that would lead from one concentration of customers to another. It may be desired to provide a discrete route decision that indicates a time for loitering in each area of customers, a location for loitering, or the like.

One technical solution provided by the disclosed subject matter is scheduling a mobile retail unit to serve one or more geographical zones based on a match between user segments of customers in the zones, and the current inventory of the retail unit. During the travel of the retail unit, probabilities of delays in potential meeting schedules of the retail unit may be continuously monitored, and order invitations may be provided to customers within a distance threshold from the retail unit. In some exemplary embodiments, based on the estimated delays, a tolerance threshold, or the like, the distance threshold may be adjusted.

In some exemplary embodiments, a mobile retail unit may be driven to points of sale, to points of return (for returning items that were kept of a trial period at a customer), or the like. The mobile retail unit may be driven by a human driver, an autonomous driving module, or the like. In some exemplary embodiments, the mobile retail unit may include one or more operators, personal shoppers, or the like (referred to as 'operators'), which may be responsible for conducting retail meetings or appointments with customers at the points of sale. In some exemplary embodiments, at each point of sale, the operator may leave the mobile retail unit, enter the point of sale (e.g., the home of the customer), and offer one or more items from the inventory of the mobile retail unit to a customer that is located at the point of sale. In some exemplary embodiments, the points of sale may comprise home addresses of customers that ordered at least one item, work addresses of customers, service providing addresses, a real time geolocation of the customer, or any other address indicated by an ordering customer directly or indirectly.

In some exemplary embodiments, the points of sale may be indicated by customers via a retail software application, a retail website, or the like (referred to as 'customer application'), which may belong to a retailer, be associated to a retailer, such as a retailer that owns one or more retail units. In some exemplary embodiments, in case a retail unit is near a customer, the customer may or may not obtain an appointment invitation, inviting her to order one or more items from the retail unit for keeping during a trial period, for purchasing, for trying on, for discarding, or the like. In some exemplary embodiments, in response to an order from a customer, the retail unit may drive to a point of sale of the customer, and enable the operator to conduct an appointment with the customer, in which one or more items from the inventory may be presented to the customer.

In some exemplary embodiments, appointment invitations may be provided to customer via the customer application, notifications thereof, one or more messages independent of the customer application, or the like. In some exemplary embodiments, the customer application, notifications thereof, or the like, may present to a customer one or more items that are currently stocked in the mobile retail unit, and can be provided swiftly, e.g., up to a defined threshold such as a half an hour, 15 minutes, or the like. For example, a notification of the customer application may provide a link to a page of the customer application that presents the available items to the customer, enabling the customer to order items via the page. Alternatively, a notification may present the suggested items directly, enabling the customer to select items via the notification. In some exemplary embodiments, the items may be presented to a customer via a screen of a computing device used by the customer, or in any other manner. For example, the computing device may comprise a smartphone, a tablet, a Personal Computer (PC), an Augmented Reality (AR) device, a wearable device, a mobile device, or the like.

In some exemplary embodiments, the presented items that are presented to a customer may comprise items that are estimated to be of interest to the customer in view of her past transactions, her interests, her user profile, or the like. In some exemplary embodiments, the customer applications may present different, overlapping, or identical items to the different customers. For example, a first customer may be presented with first items, and a second customer may be presented with second items, which may comprise different items, partially overlapping items, or the like. In response to the presented items that are presented to the customer via the customer application, the customer may make an order by selecting one or more items from the presented items and ordering them for a meeting.

In some exemplary embodiments, a retail appointment may be held with a customer that has selected, such as via the customer application, one or more products they would like to assess, perceive, or physically obtain during the meeting. In some exemplary embodiments, in response to the order, the retail unit may schedule an appointment with the customer, and drive to the point of sale indicated by the customer, such as in her account at the customer application. In some exemplary embodiments, the mobile retail unit may add the customer to a dynamic travel route, and travel to the customer's indicated location, e.g., in case the customer's address complies with time constraints, cargo constraints, or the like.

In some exemplary embodiments, upon reaching the customer's indicated location, the operator may initiate the retail appointment by fetching the selected products that were selected by the customer, potentially along with auxiliary products at their discretion, and provide the fetched items to the customer. In some exemplary embodiments, the auxiliary items may be selected based on properties of the ordering customers, customer profiles, customer clusters, based on an expected utility or profit from the items, or the like. In some cases, during the appointment, the ordered items, potentially with the auxiliary items, may be delivered to the customer, such that the customer can try them on, keep them for a trial period after which she can return them or purchase them, purchase items immediately, or the like. In some exemplary embodiments, the operator may present the products to the customer, and the customer may decide which products, if any, they would like to keep for a trial period, purchase immediately, or discard. In some exemplary embodiments, after the retail appointment, the operator may return to the mobile retail unit with the remaining products and mark the status of each product via a user interface of a retail system. In some exemplary embodiments, once the retail appointment has ended and the inventory updates were registered, the driver of the mobile retail unit may travel to a next point of sale associated to a next ordering customer.

In some exemplary embodiments, the retail system may comprise a backend server, communicating with one or more frontend retail applications and location devices (e.g., a Global Positioning System (GPS) device, a geolocation device, a cell tower-based triangulation module, Wi-Fi positioning system, or the like) associated with mobile retail units, with one or more customer applications of the customers, or the like. In some exemplary embodiments, the backend server may retain records of events such as meeting events, objects such as item objects, or the like. For example, an item object may retain a status of the object (kept at a customer for a trial period, purchased by a customer, currently in stock at a retail unit, in storage), a history of the object such as the meetings in which the item was presented, an address of a customer that kept the item temporarily, a specified customer that purchased the item, a specified retail unit that retains the item, or the like.

In some exemplary embodiments, the server may accumulate real time data from the drivers and operators of each mobile retail unit via the frontend applications, and from location devices of each retail unit. In some exemplary embodiments, a location device of mobile retail unit may be configured to measure the location of the mobile retail unit continuously or periodically, and send signals indicating its location to the backend server, thereby enabling the server to monitor a distance between the retail unit and addresses of nearby customers in real time. In some exemplary embodiments, based on the accumulated real time data, the server may update the frontend applications with real time data, derivations, alerts, information, or the like.

In some exemplary embodiments, one or more zones may be assigned to each mobile retail unit based on one or more calculations relating to parameters such as user segments of customers located in the zones, characteristics of the inventory of the retail unit, user segments associated to the inventory, or the like. In some exemplary embodiments, the geographical zones may be assigned to a retail unit in case registered customers within the zones have characteristics, or user segments, that match characteristics of items in the inventory of the retail unit. In some exemplary embodiments, a matching score between a zone and an inventory of a retail unit may indicate a probability that user segments of customers in the zones will engage with items of the inventory.

In some exemplary embodiments, based on matching scores of multiple zones to the inventory of a retail unit, and an estimated load that each zone is expected to incur on the retail unit, one or more zones may be selected and assigned to the retail unit. In some exemplary embodiments, the zones may be selected in case they comply with one or more load constraints, such as a constraint on a length of an estimated route, a constraint on an aggregated engagement level of the zones, or the like. In some exemplary embodiments, one or more orders of service may be determined between the assigned zones, indicating an order of serving the zones, such as based on estimated driving times between a current location of the retail unit and each zone, driving times between zones, preferred times of customers in each zone, or the like. In some exemplary embodiments, during the service period, sub-travels within each zone may be determined based on dynamic orders from customers within the zone.

Another technical solution provided by the disclosed subject matter is to dynamically determine which customers should be provided with order invitations at each position of the retail unit. In some exemplary embodiments, during a travel of a mobile retail unit in a determined zone, customer locations within the zone may be monitored, determined, or the like, and compared to locations of the retail unit. In some exemplary embodiments, customers that are located within a determined range or distance threshold from the retail unit may be detected. In some exemplary embodiments, at first, order invitations, inviting the customers to order one or more proposed items from the retail unit, may be sent the detected customers. In some exemplary embodiments, order invitations may be provided via a customer application, push notifications, messages with links to a site of the retailer, or the like.

In some exemplary embodiments, after initially sending the order invitations to the detected customers within the determined range, additional order invitations may or may not be sent to newly detected customers based on one or more dynamic analyses, calculations, or the like. In some exemplary embodiments, based on the dynamic analyses, a distance threshold between the retail unit and customer addresses may be adjusted dynamically, in real time, periodically, or the like. For example, the calculations may be performed periodically every 3 seconds, every 30 seconds, every minute, every ten minutes, or the like, and the distance threshold may be adjusted in case the analysis indicates that an adjustment is not harmful, is optimal, or the like. In some exemplary embodiments, the calculations may be performed in case of a dynamically changing distance of one or more customers to a location of the retail unit (e.g., in case customers walk into the distance threshold), a dynamically changing location of the retail unit, an estimation of delays in meeting schedules, or the like. In some exemplary embodiments, a customer may be considered "active" for a time period. The "active" time period may commence when the order invitation is sent, when the order invitation is received by the user device of the customer, or the like. The "active" time period may continue until a termination condition occurs. In some cases, the termination condition may be the expiration of the order invitation. An order invitation may have a lifetime duration, and upon the lifetime duration elapsing, the order invitation can no longer be used to make an order. For example, the order invitation may be preconfigured with a one-hour lifetime duration, thereafter the order invitation expires. In some cases, an order invitation may become expired after a lifetime duration, such as after two hours have passed from providing the invitation without obtaining an order from the customer. In some cases, the lifetime duration may be set statically, or dynamically, such as based on reactions of the customers to the order invitations. In some exemplary embodiments, in view of engagement patterns of the customer after receiving the order invitation, the lifetime duration may be extended or shortened. In some exemplary embodiments, if the customer performs an activity that is associated with a higher likelihood to make an order, the lifetime duration may be extended. Consider a case where the customer shares an image of an item with her friends. Such a social activity may be indicative that the customer is interested in making a purchase and is more likely to purchase than if such information wasn't available (e.g., $p(order) < p(order social-Share)$, where $p(order)$ is probability of making an order; $p(order|SocialShare)$ is probability of making an order given the information that the customer shared the information with her friend(s). Additionally, or alternatively, if the customer adds an item to a shopping cart, the lifetime duration may be extended. In some exemplary embodiments, the lifetime duration may be extended to allow the customer to complete the order and avoid having the order invitation from expiring while the customer is completing her order. Consider, as an opposite case, that the customer has received the order invitation, opened the application, viewed the items, and closed the application. Such engagement may be monitored and be indicative that the customer is less likely to make an order. As time passes, it becomes less and less likely that the customer will make an order based on the order invitation. Accordingly, the lifetime duration may be shortened. Extending or shortening the lifetime duration may be performed based on predictions provided by a machine learning predictor, deep learning predictor, or the like, that may be trained based on the customer's activity, based on a reference group of other customers with similar characteristics, or the like. As another example, the termination condition may be when the customer makes an order based on the order invitation, completes an order, including conducting a respective meeting, or the like. As yet another example, the termination condition may be based on a distance, estimated route distance, estimated travel time, or a similar measurement between the location of the retail unit and the location of the customer. For example, using positioning means, the locations of the retail unit and the user device of the customer may be determined and if the distance therebetween exceeds a distance threshold, the order invitation may become "inactive".

In some exemplary embodiments, delays in meeting schedules may be predicted or estimated based on an ordering probability of each customer, such as in view of her reaction to the order invitation, in view of her engagement with the order invitation, in view of her engagement with the application after receiving the order invitation, in view of her social activity and communications with her friends, in view of her probability of engagement with the order invitation, in view of her computed probability of conversion, or the like. In some exemplary embodiments, delays in meeting schedules may be predicted or estimated based on one or more estimations of service times, e.g., driving to each point of sale, parking in the area, conducting an appointment, or the like. In some exemplary embodiments, delays in meeting schedules may be predicted or estimated based on an estimated driving duration of driving between locations of customers that are estimated to order. In some exemplary embodiments, in case one or more delays are predicted, and the delays are longer that a defined delay threshold, and the probability of the delays is above a defined threshold, and the number of such delays is above a tolerance threshold, further order invitations may not be sent to customers, even in case they become compliant to the distance threshold, e.g., until a change in the delay prediction. For example, in case a customer arrives at a location that is within a determined distance threshold from the retail unit, and the delays are estimated to violate the tolerance threshold, the customer may not be provided with an order invitation. In other cases, such as in case the delays are estimated to comply with the tolerance threshold, the customer may be provided with an order invitation, e.g., in case the estimated delays that are incurred by inviting the customer are estimated to also comply with the tolerance threshold. In some exemplary embodiments, in case no delays are predicted, or in case predicted delays comply with the associated thresholds, the distance threshold may be increased, newly arriving customers may be invited, or the like.

Yet another technical solution provided by the disclosed subject matter is determining loitering schedules for mobile retail units. In some exemplary embodiments, in some cases, customers may be located relatively far from each other, such as in different zones, in detached zones, or the like. In some exemplary embodiments, as the retail unit drives away from a current zone, such as after sending order invitations to the customers of the zone, an estimation of meeting delays may be dynamically or continuously calculated. In some exemplary embodiments, the meeting delays may be estimated based on a delay probability, indicating a probability that a customer from the current zone will have to wait more than the delay threshold for a meeting. In some exemplary embodiments, in case the delay probabilities of the customers indicate that a certain number of customers will order meetings and wait more than the delay threshold for a meeting, the number of customers may be compared to a tolerance threshold, to determine whether the number of waiting customers is tolerable, whether the estimated waiting times are tolerable, or the like. In some exemplary embodiments, in case the delay probabilities violate the tolerance threshold, indicating that too many customers are estimated to wait for too long, the driver of the retail unit may be alerted, provided with action instructions, or the like. For example, the driver may be instructed to stop driving, so that the driving distance between the retail unit and the customers will enable the meetings to occur in time. When the probability of obtaining new orders from the current zone decreases to a defined level, the driver may continue to drive to a next zone.

One technical effect of utilizing the disclosed subject matter is managing a selection of a service area for mobile retail units, with increased effectiveness and while complying with resource constraints.

Another technical effect of utilizing the disclosed subject matter is selecting which customers should be provided with order invitations, in a manner that potentially maximizes engagement and profits, by being able to serve as many customers as possible, while limiting the queue of orders so that customers will not need to wait an unreasonable time for an appointment, and limiting out-of-stock events during which ordered items run out of stock. By inviting only customers in the area of the retail unit, and only in case estimated delays are low (in view of estimated orders), the disclosed subject matter ensures that customers will be provided with swift and efficient service, without adversely affecting an engagement level of the retail unit.

Yet another technical effect of utilizing the disclosed subject matter is determining where and when a retail unit should loiter before moving on to a next zone, based on estimations that reduce a probability of not being able to serve ordering customers, and without waiting too long in a manner that can adversely affect the number of customers that are served by the retail unit.

The disclosed subject matter may provide for one or more technical improvements over any pre-existing technique and any technique that has previously become routine or conventional in the art. Additional technical problem, solution and s effects may be apparent to a person of ordinary skill in the art in view of the present disclosure.

Referring now to FIG. 1 showing a flowchart diagram of a method, in accordance with some exemplary embodiments of the disclosed subject matter.

Figure 2:
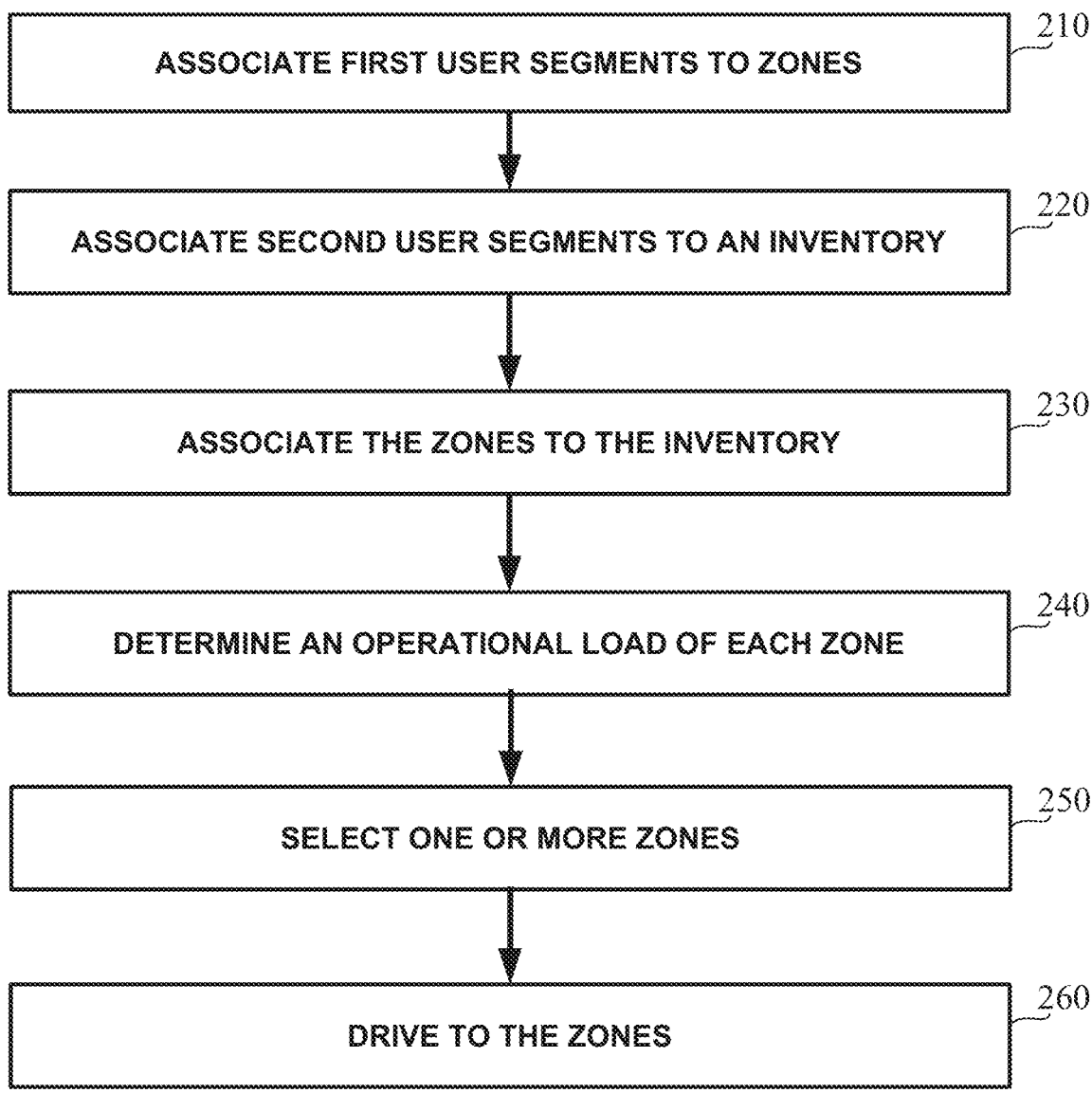
FIG. 2 shows a flowchart diagram of a method, in accordance with some exemplary embodiments of the disclosed subject matter.

On Step 110, one or more geographical zones may be assigned, designated, determined, or the like, to a mobile retail unit, e.g., according to the method of FIG. 2.

In some exemplary embodiments, prior to a work day, a shift, a travel of a mobile retail unit within a shift, or the like, a decision on which zones will be assigned to which mobile retail units may be performed, based on one or more parameters. In some exemplary embodiments, each mobile retail unit may be configured to serve customers from its assigned geographical zones.

In some exemplary embodiments, after allocating one or more geographical zones to the mobile retail unit, the mobile retail unit may be configured to serve customers from its assigned zones. In some exemplary embodiments, the customers from the one or more geographical zones may comprise customers that have an indicated address within the one or more geographical zones, such as based on transmitted real time locations signals indicating an address within the one or more geographical zones, based on a customer profile with an address entry of field, or the like. In some exemplary embodiments, the assignment may be based on first user segments of customers from the one or more geographical zones. In some exemplary embodiments, the assignment may be based on second user segments associated to an inventory of the mobile retail unit. a selection of the zones may be determined based on one or more characteristics of the inventory, one or more characteristics of the customers in the zones, one or more parameters of the inventory, one or more parameters of the customers, a matching score between the inventory and customers, or the like.

In some exemplary embodiments, the assignment of zones may be performed by comparing the first user segments to the second user segments, and identifying zones that match the inventory of the retail unit. In some exemplary embodiments, the assignment of zones may comprise estimating that a probability of engagement of the customers of the zones with items of the inventory complies with an engagement optimization criterion, with one or more constraints on resources of the mobile retail unit, or the like. For example, the engagement optimization criteria may indicate that the zones are estimated to have a high engagement rate, without violating resource constraints of the retail unit such as constraints on its time, number of meetings, number of items, a maximal service area, or the like.

On Step 120, based on the mobile retail unit being located at a location in the one or more geographical zones, a group of customers within a distance threshold from the location may be detected. In some exemplary embodiments, the customers in the group of customers may be "activated", and order invitations may be sent to the group of customers. In some exemplary embodiments, the order invitations may be configured to be sent to the group of customers sequentially, in parallel, or the like.

On Step 130, order invitations may be sent to the group of customers. In some exemplary embodiments, the order invitations may invite the group of customers to book respective meetings with the operator of the retail unit, such as by indicating items of interest from the invitation, indicating that a meeting is desired, or the like. In some exemplary embodiments, an order invitation may enable a customer to order one or more items from the mobile retail unit, and, in response to ordering the one or more items, a meeting may be scheduled and conducted with the customer. In some exemplary embodiments, during a meeting with an ordering customer, one or more items of the inventory may be configured to be presented to the customer. In some exemplary embodiments, different items may be presented to different customers, such as based on customer profiles of the customers, different user segments thereof, or the like. For example, one or more first items of the inventory may be configured to be presented during a first meeting with a first customer, while one or more second items of the inventory, at least partially different from the one or more first items, may be configured to be presented during a second meeting with a second customer. According to this example, an order invitation may enable the first customer to order at least a portion of the one or more first items from the mobile retail unit, in response to which the first meeting may be configured to be scheduled with the first customer.

It is noted that a list of currently active customers, e.g., customers that were "activated" and that were not yet "inactivated", may be compiled and utilized.

Figure 3:
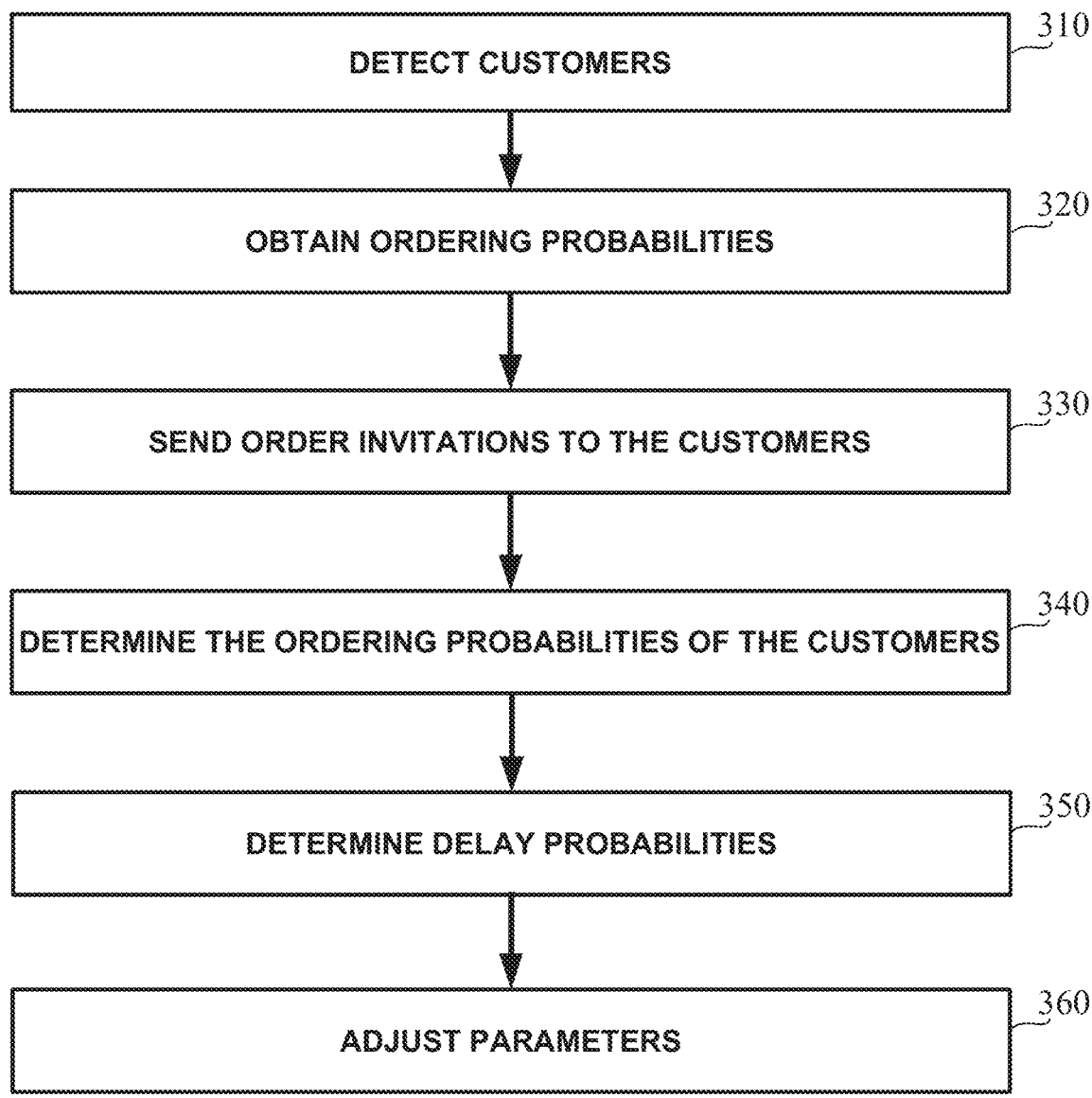
FIG. 3 shows a flowchart diagram of a method, in accordance with some exemplary embodiments of the disclosed subject matter.

On Step 140, one or more parameters may be dynamically determined, adjusted, or the like, based on a delay probability, e.g., according to the method of FIG. 3. In some cases, the distance threshold may be dynamically adjusted to increase or decrease, based on the delay probability. In some cases, activation parameters may be dynamically adjusted. For example, customers may be determined to be activated or not without modifying a distance threshold, e.g., according to the method of FIG. 3. In some exemplary embodiments, the parameters may define whether new customers can be activated (indicating that order invitations can be sent thereto), whether the distance threshold for detecting new customers should be decreased, whether the distance threshold should be increased, or the like. For example, the parameters may define whether a second group of customers, that are located within an increased distance threshold, should be invited or not in addition to an original first group of customers that are located within a current distance threshold.

In some exemplary embodiments, the delay probability may estimate a probability that the current list of active customers will suffer from one or more illegitimate delays of their meetings, e.g., delays that violate a delay threshold. For example, delays of more than 5 minutes may be considered illegitimate. In some exemplary embodiments, the delay probability may be determined based on ordering probabilities of the current list of active customers, which, in turn, may be determined based on reactions of the customers to the order invitations, customer profiles, past transactions, customer engagement, social interactions, or the like. In some exemplary embodiments, the delay probability may be determined based on predicted service times for serving active customers that are estimated to make an order, e.g., according to the ordering probabilities. In some exemplary embodiments, the delay probability may be determined based on predicted driving times for driving between predicted ordering customers. In some exemplary embodiments, the delay probability may be determined based on any other parameter.

In some exemplary embodiments, a comparison may be performed dynamically between the probability that the current list of active customers will suffer from one or more illegitimate delays (e.g., the delay probability) to a tolerance threshold. For example, a tolerance threshold may indicate that more than two customers that are estimated to suffer from an illegitimate delay, is not tolerable. In some exemplary embodiments, in case the comparison indicates that the tolerance threshold is not complied with, e.g., indicating that a number of illegitimate delays is too large, or that a period of waiting in one or more estimated meetings is too large, one or more configurations of the sending entity may be adjusted to terminate sending the invitations, to prevent from the distance threshold to be increased, to decrease the distance threshold, or the like, until the tolerance threshold is complied with. For example, in case new customers enter the range defined by the distance threshold, and the tolerance threshold is violated, invitations may not be sent to the new customers, they may not be activated, or the like.

In some exemplary embodiments, in case the comparison indicates that the tolerance threshold is complied with, e.g., indicating that a number of illegitimate delays is tolerable, new customers may be activated. In some cases, new customers that have not been activated before but meet the distance threshold may be activated. Additionally, or alternatively, the distance threshold may be increased, to identify new customers to be activated. As a result, at least some customers of a second group of customers may be invited to order items. The second group of customers may include customers within an increased distance from the location. Additionally, or alternatively, the second group of customers may include customers within the previous distance but which were not previously activated. In some exemplary embodiments, inviting the second group of customers may include iteratively sending an order invitation to a single customer from the second group of customers, determining an adjusted delay probability that takes into account the single customer, and in case the adjusted delay probability complies with the tolerance threshold, and inviting a next customer of the second group of customers. In some cases, the delay probability may be determined before sending the order invitation to the customer, and only if inviting the customer is not estimated to cause the tolerance threshold to be violated, the customer may be invited. Alternatively, the entire second group of customers may be invited by sending all of them order invitations regardless of the invitations' effect on the delay. The invitations may be sent simultaneously, sequentially, or the like.

In some exemplary embodiments, in case the comparison indicates that the tolerance threshold is complied with, and the mobile retail unit has moved to a second location in the one or more geographical zones, a third group of customers may be detected within the same distance threshold (e.g., the same as used at the first location, such as without increasing the distance threshold). In some cases, order invitations that were sent to customers while being at the first location may expire, in case a distance between the second location and the customers' locations is greater than a threshold. In some exemplary embodiments, order invitations may be sent to at least some of the third group of customers, such as based on the delay probabilities complying with the tolerance threshold, thereby activating such customers. In some cases, the delay probabilities may be determined based on active customers of the first group of customers (detected at the first location using the initial distance threshold), the second group of customers (detected at the first location using an adjusted distance threshold), and potentially some of the third group of customers. In some exemplary embodiments, activating members of the third group of customers may include iteratively inviting customers from the third group of customers one by one, two by two, or in any other order, and ensuring compliance with the tolerance threshold before adding a next customer batch. Alternatively, the entire third group of customers may be invited simultaneously, sequentially, or the like.

Referring now to FIG. 2 showing a flowchart diagram of a method, in accordance with some exemplary embodiments of the disclosed subject matter.

On Step 210, one or more first user segments of registered customers may be associated with geographical zones of the customers, assigned to the geographical zones, or the like. In some exemplary embodiments, registered customers within the zones may be classified or assigned to respective first user segments, indicating one or more categories or metrics to which each the customer is estimated to belong. In some exemplary embodiments, a customer may be determined to belong to a user segment based on user information such as demographic information of the customer, social information of the customer, historic information regarding the customer, historic transactions of the customer, derived traits of the customer, derived hobbies of the customer, or the like. For example, a user segment may indicate that a customer's age is 25-30, that his hobbies include skiing, and so on. In some exemplary embodiments, the user information may be accumulated from a network, a service, a remote server, a profile created by the customer, a data providing service, user input, or the like. In some exemplary embodiments, an assignment of user segments to one or more customers may be obtained from a third party, determined locally such as by a pre-processing or pre-calculating stage, or the like.

In some exemplary embodiments, a geographical map depicting an area in a driving distance from a mobile retail unit may be divided into multiple geographical areas, geographical zones, zip codes, or the like (referred to herein as 'zones'). For example, a zone may correspond to an area of a zip code. As another example, two or more zones may together account for a single zip code area. As another example, a zone may include one or more first portions of a first zip code area, one or more second portions of a second zip code area, or the like. In some cases, the map may not include overlapping areas that are included in two zones simultaneously.

In some exemplary embodiments, registered customers, such as customers that are registered to a service of the mobile retail units, customers that have a user profile within a backend server of the retail service, customers that have a user profile within an associated server, or the like, may be retained in association with one or more addresses, from which at least one may be active. In some cases, an address of a customer may be retrieved based on location information therefrom, e.g., provided in real time by a user device of the customer, which may indicate a current location of the customer via one or more signals, messages, or the like. In some cases, an address of a customer may be retrieved based on a textual or vocal input from the user, indicating a permanent or temporary location thereof. In some exemplary embodiments, each address of a customer may be associated with a zone in the map, located within a zone, or the like. For example, the zones together may include all of the customer addresses.

In some exemplary embodiments, a zone representation of each zone may be determined based on user segments of customers that are estimated to be located in a zone, that are associated to an address in the zone, that are associated to geographical coordinates in the zone, or the like. In some exemplary embodiments, registered customers may not be used for the zone representation, may be filtered out, or the like, in case they are not available during the service period, they are not interested in ordering, or the like, e.g., as may be indicated by the customers directly, derived based on real time information of the customer, or the like. In some exemplary embodiments, in order to represent prevalent user segments of each zone, individual user segments may be aggregated on a geographical zone level. In some exemplary embodiments, a zone representation may be determined according to a prevalence of each detected user segment within the zone, such as based on a statistical model, a statistical processing, a statistical metric, statistical measures, or the like, of user segments within the zone. For example, in case a zone includes 40 customers with a statistical segment of 'age between 15 and 25', 20 customers with a statistical segment of 'age between 25 and 35', and 1 customer with a statistical segment of 'age between 65 and 75', the zone may be classified as a 'young' zone that is characterized by young customers under the age of 35. According to this example, the single customer with the statistical segment of 'age between 65 and 75' may be excluded from the zone representation, since it may not be statistically significant, or may be represented as being insignificant, e.g., by a small visual representation that is smaller than the representations of the remaining user segments. In some cases, statistical segments that are found in a zone less than a certain threshold percentage, or less than a defined number of times, may or may not be excluded from the zone representation.

In some exemplary embodiments, a zone representation of each zone may include a table, or any other data structure, that is generated to represent a number of customers that are associated with each segment for each zone, a percentage of customers that are associated with each segment for each zone, or the like. In some exemplary embodiments, a zone representation may indicate statistically significant user segments of each zone. In some cases, the zone representation may comprise a 'Zone—User Segment' table, that indicates a number of customers that are associated with each segment within a zone. For example, the 'Zone—User Segment' table, or any other zone representation, may indicate a percentage of customers that match to a user segment, a number of customers that match a user segment, or the like. In some cases, all or some of the first user segments found in the zone may be represented by the 'Zone—User Segment' table.

On Step 220, one or more second user segments may be associated or matched to an inventory of a mobile retail unit. In some exemplary embodiments, an association between an item of the inventory and one or more second user segment may be determined, pre-calculated, obtained, or the like, such as based on historic data, behavioral patterns, transaction histories of user segments, or the like. For example, women's clothes may be matched to the following user segments: a female gender, a crossdresser hobby, an age range of consumers that typically wear similar clothes styles, or the like.

In some cases, each item in an inventory of a mobile retail unit may have a determined match to one or more user segments, which may be predetermined, obtained from a third party, determined, or the like. For example, all the items of a retailer, including items external to the inventory of the retail unit, items in a storage, items that have not yet arrived, or the like, may be assigned or matched to one or more user segments prior to stocking retail units with items. In other cases, properties of items of an inventory of a mobile retail unit may be analyzed to determine user segments matching thereto after stocking the items on retail units.

In some exemplary embodiments, an inventory representation of each item may include a table, or any other data structure, that is generated to represent second user segments that are associated to each item. In some exemplary embodiments, an inventory representation may indicate statistically significant user segments of each item. In some cases, the inventory representation may comprise a 'Truck—User Segment' table, which indicates user segments that are associated to each item. In some cases, all or some of the user segments found for an item may be represented by the 'Truck—User Segment' table. In some exemplary embodiments, the inventory representation may be generated to represent an overall matching level of second user segments to an inventory of a mobile retail unit, such as by aggregating user segments of each item and statistically processing the aggregation. For example, for a mobile retail unit that is stocked with hockey equipment, and with few computing equipment, the inventory representation may indicate a high match for user segments that have a history of purchasing sport equipment, a high match for user segments that have a history of purchasing hockey equipment, a high match for user segments that have a hockey hobby, a high match for user segments that are within an age range that is statistically most probable for playing hockey, and so on.

On Step 230, the inventory of the retail unit and each of the one or more zones may be associated according to one or more matching scores between the first and second user segments. In some exemplary embodiments, matching scores may indicate a matching level between the first user segments of each of the one or more zones and the second user segments of the inventory of the retail unit. In some exemplary embodiments, a matching score (referred to as 'a truck-zone matching score') may be determined for each combination of a mobile retail unit and geographical zone, such as based on the zone representations of Step 210, the inventory representations of Step 220, or the like. For example, matching scores may be determined based on the 'Zone—User Segment' table and the 'Truck-User Segment' table, such as by processing both tables, and identifying user segments that are prominent is both an inventory and a zone, that are identical in both the first and second user segments, that belong to a same category or cluster in both the first and second user segments, or the like.

For example, the truck-zone matching score may indicate that the cargo of a retail unit matches mostly to three user segments, which characterize customers of four geographical zones. As another example, in case an inventory of a retail unit comprises women clothes associated with the second user segments 'female', 'housewife', 'age between 55-65', 'shopping 1+ times a week', and 'flying 1+ times a year', and a zone includes corresponding user segments (similar or identical) in a statistically significant manner, the zone may be matched to the retail unit with a high matching score, e.g., a score greater than a threshold, a score greater than truck-zone matching scores of the remaining zones, or the like. As another example, in case an inventory of a retail unit is associated to second user segments, and a zone includes different user segments that belong to a same cluster, indicating that customers within the zone belong to a category of people that are likely to engage with the inventory, even if assigned to different user segments, a matching score between the inventory and the zone may be set to a high score (e.g., above a threshold).

On Step 240, an operational load that is estimated to be caused by each zone to the retail unit may be determined. In some exemplary embodiments, the operational load may indicate a load incurred to the retail unit from serving each zone, e.g., based on estimated engagement of customers, estimated driving times in each zone, estimated orders of items, or the like.

In some exemplary embodiments, the operational load of a retail unit may be determined based on estimated engagement scores of customers within each zone. In some exemplary embodiments, for each zone, an aggregated engagement score such as an Aggregated Expected Engagement Score (AEES) may be determined, e.g., as follows:

$$AEES = \sum_{1}^{n} p(\text{engagement}) \tag{1}$$

wherein n denotes a number of customers in a zone, and p(engagement) denotes a probability of engagement of each customer in the zone with an order invitation. In some exemplary embodiments, the resulting AEES score of a zone may indicate a probability of engagement of customers with invitations associated to an inventory of a retail unit, in a specific zone. In some exemplary embodiments, the resulting AEES score of a zone may be used to estimate an operational load on a retail unit that will be incurred or caused by each zone.

In some exemplary embodiments, the probability of user engagement in a zone, e.g., p(engagement), may be determined based on the truck-zone matching score of the zone and the inventory, based on the user segments that match the retail unit such as indicated by the 'Truck—User Segment' table, based on the user segments associated with customers of each zone such as indicated by the 'Zone—User Segment' table, or the like. In some exemplary embodiments, the probability of user engagement in a zone may be determined or estimated based on one or more data points or records that may be retained for each customer, such as within a customer profile, a repository of a backend server, or the like. In some exemplary embodiments, the data points may include one or more historic data entries of the customer, one or more categories to which the customer belongs, one or more data regarding the customer, historic patterns, historic transactions, or the like. In some exemplary embodiments, data points of a customer may be used, instead of or in addition to, the truck-zone matching scores, the inventory representation, the zone representation, or the like, to determine a probability that the customer will engage with a retail unit in view of the inventory of the retail unit. In some exemplary embodiments, the probability of user engagement may be determined locally, obtained from a server, or the like. In some exemplary embodiments, the probability of user engagement may be determined using one or more statistical processing, one or more statistical predictors, rules, heuristics, machine learning predictors, or the like.

In some exemplary embodiments, a linear relationship may be defined between a probability of user engagement in a zone and a respective operational load of the zone, in which high user engagement in a zone causes high operational load of the zone, and vice versa. In some exemplary embodiments, an estimated operational load incurred by a zone may indicate an absolute number of customers that are estimated to order items within the zone, an absolute number of meetings with customers that are estimated to be booked within the zone, an absolute number of driving hours that are estimated to be needed to navigate to all of the estimated meetings, or the like. In some exemplary embodiments, an estimated operational load incurred by a zone may indicate a percentage of time of a shift, a working day, or the like, that is estimated to be consumed for serving a zone. In some exemplary embodiments, an estimated operational load incurred by a zone may represent resources that are estimated to be consumed by the zone in any other manner, representation, or the like.

In some exemplary embodiments, an aggregated AEES score may be determined by aggregating AEES scores of a plurality of zones, e.g., all the zones, a subset thereof, or the like, e.g., as follows:

$$\text{aggregated } AEES = \sum_{1}^{m} \sum_{1}^{n} p(\text{engagement}) \qquad (2)$$

wherein m denotes a number of zones. In some exemplary embodiments, the aggregated AEES score may aggregate the AEES scores of each zone, and may indicate an overall operation load of the retail unit, incurred by the aggregated zones. In some exemplary embodiments, an aggregated AEES score of a set of zones may be determined by aggregating AEES scores of the set of zones. For example, an aggregated AEES score may be determined for each subset of zones, to estimate a load incurred by each combination of zones.

In some exemplary embodiments, an estimated operational load incurred by one or more zones (e.g., the aggregated AEES score) may be considered infeasible, such as in case serving the zones is estimated to consume more resources than can be provided by the retail unit, in case serving the zones will incur unreasonable waiting time for ordering customers, or the like. For example, in case 80% of the customers within a zone are expected to engage with the inventory by ordering a meeting, and the total number of customers within the zone is above 100, the estimated operational load may be considered high, infeasible, unreasonable, or the like, since a single retail unit may, in some cases, not have sufficient resources to serve (e.g., conduct appointments with) 80 customers within a single shift.

On Step 250, one or more zones may be selected to be served by a retail unit based on an aggregated AEES score of the one or more zones having a score that matches the resources of the retail unit. In some exemplary embodiments, the one or more zones be selected based on a combination of the aggregated AEES score with any other parameters, such as a driving distance between the zones, an estimated driving time through the zones, or the like.

In some exemplary embodiments, the zones may be selected in case they optimize on one or more parameters, e.g., have a maximized aggregated AEES score that complies with resource constraints. In some cases, based on the resources of the retail unit, a load threshold may be determined, indicating a maximal load that can be handled by the retail unit during the service period. In such cases, the zones may be selected to include a maximal aggregated AEES score that complies with the load threshold.

In some exemplary embodiments, the resource constraints, which may be used to determine the load threshold, may comprise constraints on a number of engagements, a maximal delay of meetings, driving times, serving times for meetings, average serving times of a customer, average driving times between points of sale, or the like. In some exemplary embodiments, the resource constraints may comprise a service constraint on an overall AEES score of the selected zones, indicating an overall number of engagements or orders to be served by the retail unit. In some exemplary embodiments, the service constraint may define that the aggregated AEES score of the selected zones cannot be greater than a predetermined threshold, a determined threshold, or the like. For example, the threshold may be set to a value that is estimated to prevent the aggregated AEES score of the selected zones to include a high engagement level that may result with orders of items that cannot be served, that go out of stock, or the like. In some exemplary embodiments, the resource constraints may comprise a driving constraint, which may include a constraint on a number of driving hours, a size of a service area, a route length, or the like, that can be traversed during the service period while serving customers. In some exemplary embodiments, the driving constraint may be compared to an estimated driving time between zones, an estimated driving time between meetings of each zone, an estimated refueling time, or the like, to determine whether the estimated driving periods comply with the driving constraint. In some exemplary embodiments, the estimated driving time may take into account average traveling times, technical driving constraints of the retail unit, speed limits, estimated traffic, or the like. In some exemplary embodiments, the driving constraint may be defined based on an estimated non-driving time during the service period, so that the driving constraint ensures the driving time does not affect or disrupt the non-driving time. In some exemplary embodiments, the non-driving time may comprise estimated meeting times, parking times, entering or exiting points of sale after parking, or the like. In some exemplary embodiments, the resource constraints may comprise a service constraint, which may include a constraint on a number of possible meetings with customers that can be served, in view of the available time in the service period and the available items in the inventory. For example, in case the inventory includes 100 items, a probability that the retail unit will be able to serve more than 100 customers may be very low, e.g., below a service threshold.

On Step 260, the retail unit may be instructed to traverse the one or more zones that are selected, and to offer its services to customers during of the selected zones. In some exemplary embodiments, after selecting the one or more zones, the driver of the mobile retail unit may drive to a first zone of the one or more zones, invite nearby customer to order items, and stop at points of sale upon receiving an order associated to the point of sale. In some exemplary embodiments, at every point of sale, the operator may leave the mobile retail unit, obtain multiple suggested items for the customer, offer the items to the customer, and then embark the mobile retail unit with the remaining items to continue to the next point of sale. In some exemplary embodiments, the retail unit may remain static for a determined time period, such as prior to obtaining orders, or continue driving.

In some exemplary embodiments, upon entering a zone that was selected by Step 250, navigation instructions and routes may be determined based on dynamically obtained locations of sale. In some exemplary embodiments, a travel route of the mobile retail unit may be determined dynamically, based on obtained orders from multiple customers that are taken via their customer applications, via an invitation message, or the like. In some exemplary embodiments, a travel route of the mobile retail unit within the zone may be determined based on an optimization scheme that is configured to minimize the traveling time in view of constraints such as points of sale of ordering customers, the estimated travel time between addresses of points of sale, expected traffic in different times of day, expected traffic in different areas, or the like.

Referring now to FIG. 3 showing a flowchart diagram of a method, in accordance with some exemplary embodiments of the disclosed subject matter.

On Step 310, during a travel of a retail unit within or near a selected zone (selected at Step 250 of FIG. 2), locations of one or more customers within a certain distance from the retail unit may be detected, determined, monitored, or the like. For example, customers' locations may be determined statically based on customer accounts and noted addresses therein. As another example, customers' locations may be determined dynamically using location sensors, such as GPS receiver, Wi-Fi positioning module, or the like. In some cases, the customers' locations may be detected during a mobile portion of the travel (e.g., when the mobile unit is enroute), a static or non-mobile portion of the travel (e.g., when the mobile unit is stationary), or the like. In some exemplary embodiments, the distance range between the customer's locations and the location of the retail unit may be defined by a distance threshold, metric or range (referred to as 'distance threshold') such as a driving distance, a physical distance, or the like. In some exemplary embodiments, the driving distance between a retail unit and a customer's point of sale may be determined, estimated, or the like, based on a physical distance measured on available routes between the retail unit and the customer's point of sale, based on real time traffic indications, based on average driving times of historic drivers traversing the same route, or the like, which may be compared to the distance threshold.

In some exemplary embodiments, the distance threshold may be set based on one or more calculations, determinations, or the like, such as based on a maximal driving time to a customer that is not estimated to cause customers to be unsatisfied, that does not cause driving between customers to consume too much time, or the like. For example, in case it is not desired that customers will wait more than 15 minutes (or any other delay threshold) from making an order until a meeting with the operator is conducted, the distance threshold may be set to be 15 minutes, such that only customers that are located within a driving distance of 15 minutes from a current position of the retail unit may be activated. In some cases, and as some additional meetings may be conducted prior to the meeting of any one customer, the distance threshold may be set to be less than 15 minutes, such as 10 minutes, 9 minutes, 5 minutes, or the like.

In some exemplary embodiments, a distance between customers' locations and the location of the retail unit may be monitored during the travel of the mobile retail unit, and in some cases, at least some customers that are located within the distance threshold may be activated and provided with order invitations.

On Step 320, ordering probabilities of customers may be estimated, computed, obtained, determined, or the like, e.g., in view of potential customer reactions to order invitations. In some exemplary embodiments, the ordering probabilities may be based on one or more global or independent predictions of customer engagements and conversions, that are not associated with a specific customer. In some exemplary embodiments, the ordering probabilities may be computed based on predictions and in view of monitored activity of the user, such as responses of the customer to the order invitation; engagement of the customer with an item for sale; social interactions of the customer with another; lack of responses, engagements, or social interactions; or the like, e.g., using one or more independent ordering probabilities, global ordering probabilities, or the like. For example, the ordering probabilities may indicate a probability that a potential customer will order an item in case the customer did not engage with the item, in case the customer engaged with the item but did not reach a landing page associated with the item, in case the customer added an item to a shopping cart, in case the customer made a social interaction, or the like. As another example, the ordering probabilities may indicate a probability that a customer will engage with an order invitation, such as in view of different contexts, in view of an elapsed time, or the like.

In some exemplary embodiments, the independent ordering probabilities may be determined, predetermined, or the like, e.g., prior to detecting the customers at Step 310, thereafter, or the like. In some exemplary embodiments, the independent ordering probabilities may be determined based on historic reactions of customers and ordering rates (e.g., conversion rates) associated to each reaction. For example, each historic reaction may be tagged or labeled as 'ordered' or 'not ordered' based on whether or not the customer eventually ordered the item to which the customer reacted, and a classifier may be trained to predict which reactions are expected to cause conversions, at what rates or probabilities, or the like.

In some exemplary embodiments, the ordering probabilities may comprise an engagement probability with respect to a potential or actual order invitation (referred to as 'open/context probability'), which may be determined in view of a context. In some exemplary embodiments, the open/context probability may indicate a probability of customers to engage with a provided order invitation such as by opening a push notification, opening a message with a link to a retailer site, or the like, in a context that includes a customer's profile, a customer's cluster, the type of invitation, environmental parameters, context parameters such as a time of day, or the like. In some exemplary embodiments, the engagement probability with the invitation may be calculated based on the customers' historic engagement rate, e.g., with similar or different order invitations, with invitations or notifications from the same retailer, with invitations or notifications from a different retailer, or the like. In some exemplary embodiments, the engagement probability with the invitation may be calculated based on historic properties of the invitation's real time context such as historic engagement trends during the current day of week, the current time of day, the estimated time of day during which the invitation will be sent, the weather, a number of days until a next holiday, or the like.

In some exemplary embodiments, the ordering probabilities may comprise an engagement probability (referred to as 'open/time probability') for a potential order invitation, which may be determined in view of the time that passed since the invitation was received at a user device without the user consuming the invitation. In some exemplary embodiments, the 'open/time probability' may include a probability of engaging or opening an order invitation as a function of time that passes since an invitation is sent. For example, as more time passes from sending the invitation without the customer consuming the invitation, the probability that the customer will consume the invitation may decrease, increase, or the like. In some exemplary embodiments, the engagement probability in view of elapsed time may be calculated based on historic engagements of customer as a function of the elapsed time, historic engagements of a customer cluster as a function of the elapsed time, or the like.

In some exemplary embodiments, the ordering probabilities may comprise an ordering probability (referred to as 'order/browse probability') associated with a potential order invitation. In some exemplary embodiments, the order/browse probability may indicate a probability that a customer will order products in case the customer is actively browsing the customer application, actively viewing the suggested items, or the like. In some exemplary embodiments, a customer may be able to browse and view the suggested items of an invitation upon selecting a link from the invitation to a customer application or website, by directly viewing suggested items within the invitations, or the like. In some exemplary embodiments, the order/browse probability may be determined based on historic behavioral patterns of customers or customer clusters that viewed or did not view an order invitation, based on conversion rates of browsing customers with respect to non-browsing customers, based on a type of browsing, based on conversion rates of each type of browsing, or the like. In some exemplary embodiments, the order/browse probability may be determined based historic interactions with the retailer application, based on historic interactions with other applications, or the like.

In some exemplary embodiments, the ordering probabilities may comprise an ordering probability (referred to as 'order/cart probability') associated with a potential order invitation. In some exemplary embodiments, the order/cart probability may indicate a probability of ordering products in case a customer selects items in the customer application, adds items to a shopping cart of the customer application, saves items within the invitation, or the like. In some exemplary embodiments, while browsing the customer application, a customer may be able to select, or show interest in suggested items such as by adding the items to a shopping cart, adding the items to a list of favorite items, saving the items in the customer application for future retrieval, or the like, without effectively ordering the items. In some exemplary embodiments, the order/cart probability may be determined based on historic behavioral patterns of customers that did or did not add items to a cart, based on conversion rates of customers that saved items with respect to customers that did not, based on a type of interaction that was performed when saving items, or the like. In some exemplary embodiments, the order/cart probability may be determined based historic interactions with the retailer application, based on historic interactions with other applications, or the like.

In some exemplary embodiments, the ordering probabilities may comprise an ordering probability (referred to as 'order/click_no_browse probability') associated with a potential order invitation. In some exemplary embodiments, the order/click_no_browse probability may indicate a probability of ordering products in case a customer selected or clicked on an invitation, an item presented in the invitations, or the like, without browsing an associated landing page of the customer application, without adding items to a shopping cart, and without saving items for later. For example, the invitation message may comprise a notification that lists four items, and the customer may click on the notification, without following a link to the customer application. As another example, the customer may call the retailer, in response to the invitation, and order the items via the call instead of via the application. In some exemplary embodiments, the order/click_no_browse probability may be determined based on historic behavioral patterns of customers that did or did not order items without browsing or saving items, based on conversion rates of customers that ordered items without browsing or saving items, based on types of interactions that were performed in cases of ordering items without browsing or saving items, or the like. In some exemplary embodiments, the order/click_no_browse probability may be determined based historic interactions with the retailer application, based on historic interactions with other applications, or the like.

On Step 330, order invitations may be sent to the detected customers, e.g., customers located within the distance threshold. This step may be performed before Step 320, after Step 320, or the like. In some cases, the order invitations may be provided to the customer sequentially, in parallel, or the like. In some exemplary embodiments, all or some of the listed customers within the distance threshold may be provided with an invitation. In some exemplary embodiments, order invitations may be provided to the listed customers via a customer application, push notifications, messages with links to a site of the retailer, or the like. In some exemplary embodiments, order invitations may comprise a suggestion of one or more items from the inventory that are estimated to be of interest to the designated customer, that are estimated to be available (e.g., in stock) in view of other estimations of order invitations to other customers, or the like. In some exemplary embodiments, once an invitation is sent to a customer, the retailer may not have control on whether or not the customer will open the customer application and submit an order thereby.

On Step 340, the ordering probabilities of the listed customers may be determined. In some exemplary embodiments, one or more real time responses, reactions, engagements, social interactions, lack thereof, or the like, of the customers to the order invitations may be measured over time. In some exemplary embodiments, based on one or more reactions to the order invitations, an ordering probability of each invited customer may be determined, e.g., continuously, periodically, or the like. In some exemplary embodiments, at each point of time, a reaction of a customer to an invitation may be detected, measured, or the like. In some exemplary embodiments, a reaction may include ignoring the invitation, such as by not clicking or opening the invitation. In some exemplary embodiments, a reaction may include opening the invitation, upon clicking or opening the invitation. In some exemplary embodiments, a reaction may include browsing the content, upon engaging with the invitation, such as by following a link thereof to a landing page of a customer application or website, browsing the page, or the like. Additionally, or alternatively, the reaction may be measured, such as a browse time in the landing page, in the site, using the application, or the like. Additionally, or alternatively, activity patterns may be identified, such as activity indicating the customer considering ordering an item, an activity indicating a customer idly browsing, or the like. As an example, the customer may browse and reach an item of interest, take a screenshot of the item, and share the screenshot with her friends to receive feedback. Such an activity pattern may be indicative that the customer is more likely to order the item than with respect to an item the customer has viewed but not shared with her friends. In some cases, sharing activities with friends and other social network connections may be monitored and measured to determine the ordering probability. In some exemplary embodiments, a reaction may include saving items for future orders, such as by adding items to a shopping cart. In some exemplary embodiments, a reaction may include viewing an invitation without browsing items, such as for example, viewing an order, without browsing or saving items.

In some exemplary embodiments, in case a customer engages with an order invitation, such as by selecting the invitation message, viewing the message, clicking on a notification, opening the message, or the like, an ordering probability for the customer may be determined based on the order/browse probability, the order/cart probability, and the order/click_no_browse probability, e.g., according to the circumstances. For example, in case the invitation message was selected, and the customer browsed the customer application in response to the invitation, such as by following a link thereto, the ordering probability for the customer may be determined based on the order/browse probability. As another example, in case the invitation message was selected, and the customer browsed the customer application in response to the invitation, and saved one or more items, such as by adding items to a shopping cart, the ordering probability for the customer may be determined based on the order/cart probability. As another example, in case the invitation message was selected, opened, consumed, or the like, and the customer did not browse the customer application or save items for later, the ordering probability for the customer may be determined based on the order/click_no_browse probability.

In some exemplary embodiments, in case a customer did not engage with the invitation message, an engagement probability, indicating a probability that the customer will engage or open the invitation may be determined based on the open/context probability, the open/time probability, a combination thereof, or the like. For example, as the time passes, the open/time probability of a customer may decrease. As another example, a context of the customer may be determined, estimated, measured, or the like, and may be used to determine the open/context probability. In some cases, the context may dynamically change, e.g., as time passes.

In some exemplary embodiments, an overall ordering probability of a group of customers, indicating a number of orders that are expected to arrive from the group of customers, may be determined based on the order/browse probability, the order/cart probability, the order/click_no_browse probability, the open/context probability, the open/time probability, or the like. For example, at a certain time interval, reactions of the customers obtained up to the time interval may be used to determine an estimated engagement and conversion rate of the customers, e.g., by applying the associated probability calculation for each customer.

On Step 350, based on the determined ordering probabilities of the group of customers, delay probabilities indicating estimated delays in retail meetings may be predicted, estimated, or the like. In some exemplary embodiments, delay probabilities may be predicted or estimated based on the ordering probability of each customer, such as in view of his or her reaction or nonreaction to the order invitation, as determined on Step 340. For example, for a group of 40 customers that were invited, 20 may be estimated to order items. In some exemplary embodiments, delay probabilities may indicate a probability that a customer will wait more than a delay threshold between ordering an item and being provided with a retail meeting. In some exemplary embodiments, the delay threshold may be set based on an estimated customer tolerance to delays, a user preference of each customer, or the like, and may indicate a maximal time a customer desires or agree to wait for an appointment. For example, customers may indicate their preferred waiting time in their account.

In some exemplary embodiments, a delay probability may indicate a probability that a service provided to a customer will not comply with the delay threshold. For example, in case the delay threshold is set to 30 minutes, a delay probability may indicate that a customer has a probability of less than 10% of waiting for an appointment for more than 30 minutes. In some exemplary embodiments, delay probabilities for customers may be determined in real time, such as periodically, continuously, or the like.

In some exemplary embodiments, a delay probability may be determined for each invited customer, e.g., based on the ordering probability of the customer, the associated delay threshold, estimated traveling times, estimated service times, or the like. In some exemplary embodiments, the estimated traveling times may be determined based on one or more statistical parameters, such as an average time to serve a customer at a point of sale, an average time of an appointment, an average driving time between two customers in a radius of the distance threshold, a probability of engagement of each user, or the like.

In some exemplary embodiments, the delay probability may be determined based an estimated service time for a customer, which may comprise an estimated timeframe for driving to a point of sale of the customer, an estimated timeframe for parking the retail unit, an estimated timeframe for obtaining the items that are ordered by the customer along with auxiliary items, an estimated timeframe for entering the point of sale, an estimated timeframe for performing a meeting with the customer, and an estimated timeframe for returning to the retail unit. In some exemplary embodiments, in order to determine a service time of a customer, one or more location sensors such as Global Positioning System (GPS) devices of customers may be monitored to identify a location of the customer in real time, and retrieve one or more parameters associated to the real time location. For example, based on a real time location of a customer, historic information associated with the location may be retrieved, including parking time, distance from parking to entrance, ease of entrance, expected elevators, or the like.

On Step 360, based on the determined delay probabilities of a group of invited customers, one or more parameters associated with group of customers may be adjusted. For example, the parameters may comprise a distance threshold, an activation status of newly approaching customers within the distance threshold, or the like. In some exemplary embodiments, in order to maximize profits, by being able to serve as many customers as possible, while limiting the queue of orders so that customers will not need to wait an unreasonable time for an appointment (e.g., above the delay threshold), one or more calculations, algorithms, or the like, may be performed, such as by balancing delay probabilities with ordering probabilities.

In some exemplary embodiments, adjusting the one or more parameters associated with the group of customers may comprise adjusting a status of non-invited customers within the distance threshold. In some exemplary embodiments, the delay probabilities may be analyzed to detect one or more delayed customers that are estimated to be served after the delay threshold, e.g., based on a probability threshold indicating that a meeting will be delayed in a high probability. In some exemplary embodiments, based on a comparison between the number of delayed customers and a tolerance threshold, a group of customers may be classified as an open group, indicating that new customers entering the distance threshold may be invited as well, or a closed group, indicating that new customers may not be invited. New customers may comprise customers that comply with the distance threshold, such as at a static period of the retail unit. For example, new customers may enter an area near the retail unit, within the range of the distance threshold. In some exemplary embodiments, the tolerance threshold may be set to comprise a number of delayed customers that are tolerable, such as zero, 1, 2, 10, or the like, which may be set based on customer feedback, based on historic data, based on a user preference, a preference of the retailer, business logic, or the like. In some exemplary embodiments, the group of customers may be classified as an open or closed group periodically, continuously, or the like, and one or more responsive actions may be performed in response. For example, order invitations may be sent or blocked based on the classification. In some exemplary embodiments, in case the group of customers are determined to comply with the tolerance threshold, the group of customers may be classified as an open group, and one or more newly detected customers may be invited. In some cases, new customers may be invited as long as adding them is not estimated to violate the tolerance threshold. In some exemplary embodiments, in case the group of customers are determined to violate the tolerance threshold, the group customers may be classified as a closed group, sending invitations to new customers may be disabled. For example, a customer that enters the distance threshold of the retail unit may not be provided with an order invitation. In some exemplary embodiments, in case the group is classified as closed, a responsive action may include decreasing the distance threshold, preventing from the distance threshold to increase, or the like.

In some exemplary embodiments, adjusting the one or more parameters associated with the group of customers may comprise adjusting the distance threshold. In some exemplary embodiments, new customers may be invited by increasing the distance threshold, such as at a static or dynamic period of the retail unit. For example, increasing the distance threshold may include increasing a radius of driving distances between customers and the retail unit, thus enabling new customers to be invited. In some exemplary embodiments, the distance threshold may be increased to a new distance threshold based on an estimated delay associated with customer addresses within the new distance threshold. For example, in case the original distance threshold comprises 300 meters, and an estimated delay of 400 meters is estimated to comply with the tolerance threshold, while an estimated delay of 500 meters is estimated to violate the tolerance threshold, the distance threshold may be increased to 400 meters. In some exemplary embodiments, new customers may be invited by identifying new customers with respective locations that comply with the new distance threshold, such as at a mobile or static period of the retail unit.

In some exemplary embodiments, adjusting the parameters may affect a number of invited customers, such as in order to ensure that the number of orders does not require more resources than available at the retail unit, while maximizing the potential number of orders. For example, in case too many orders are received, some orders will be declined due to a lack of time, out-of-stock items, long waiting periods that overpass the waiting threshold, or the like. In some exemplary embodiments, countermeasures preventing new orders (e.g., the responsive actions) may be deployed until an updated delay prediction complies with the tolerance threshold, resulting with a low rate of declined or delayed orders. In some exemplary embodiments, upon identifying that the invited customers comply with the tolerance threshold, the countermeasures may be removed, e.g., enabling to invite new customers, restoring a previous greater distance threshold, or the like.

In some exemplary embodiments, during a drive through a selected zone of the service area, at each point in time, customers near the area of the retail unit may be detected dynamically as complying with a defined distance threshold. In some exemplary embodiments, as the retail unit moves, the identity of customers that comply with the distance threshold may dynamically change, as different customers may become compliant with the distance threshold in each geographical location of the retail unit. For example, in case the distance threshold includes a driving distance of 10 minutes, a customer that had a driving distance of 20 minutes from the retail unit at a first geographical point during a first period may not comply with the distance threshold during the first period. After the retail unit moves to a second geographical point that is a driving distance of 5 minutes from the customer, during a subsequent period, the same customer may comply with the distance threshold. In some exemplary embodiments, compliance of customers with the distance threshold may be determined periodically, continuously, or the like. In some exemplary embodiments, in case the group is classified as open, the new customers complying with the distance threshold may be provided with order invitations. In some exemplary embodiments, in case the group is classified as closed, the new customers complying with the distance threshold may not be provided with order invitations.

In some exemplary embodiments, the distribution of invitation messages to customers may take into account a context of the transmission, such as times of day that are estimated to be comfortable for customers, profitable, or the like, such as based on customer preferences, based on statistics, or the like. In some exemplary embodiments, the invitations may suggest one or more items that are still available in the retail unit, that are estimated to be available for the customer at a time of the meeting, that are estimated to be of interest to the customer, or the like. In some exemplary embodiments, in response to an invitation, a customer may ignore the invitation, open the invitation, engage with the invitation, save one or more items, order one or more items, or the like.

In some exemplary embodiments, upon obtaining an order of a customer, an appointment of the operator with ordering customer may be scheduled at a point of sale within a determined delay threshold, e.g., 15 minutes, 30 minutes, or the like, or within the tolerance threshold. In some exemplary embodiments, during the appointment, inventory items that were ordered by the customer may be provided as ordered items, and one or more additional items may be provided as auxiliary items that are not ordered by the customers. In some exemplary embodiments, at an end of the meeting, the customer may decide which products, if any, they would like to keep for a trial period, purchase immediately, or return.

Figure 4:
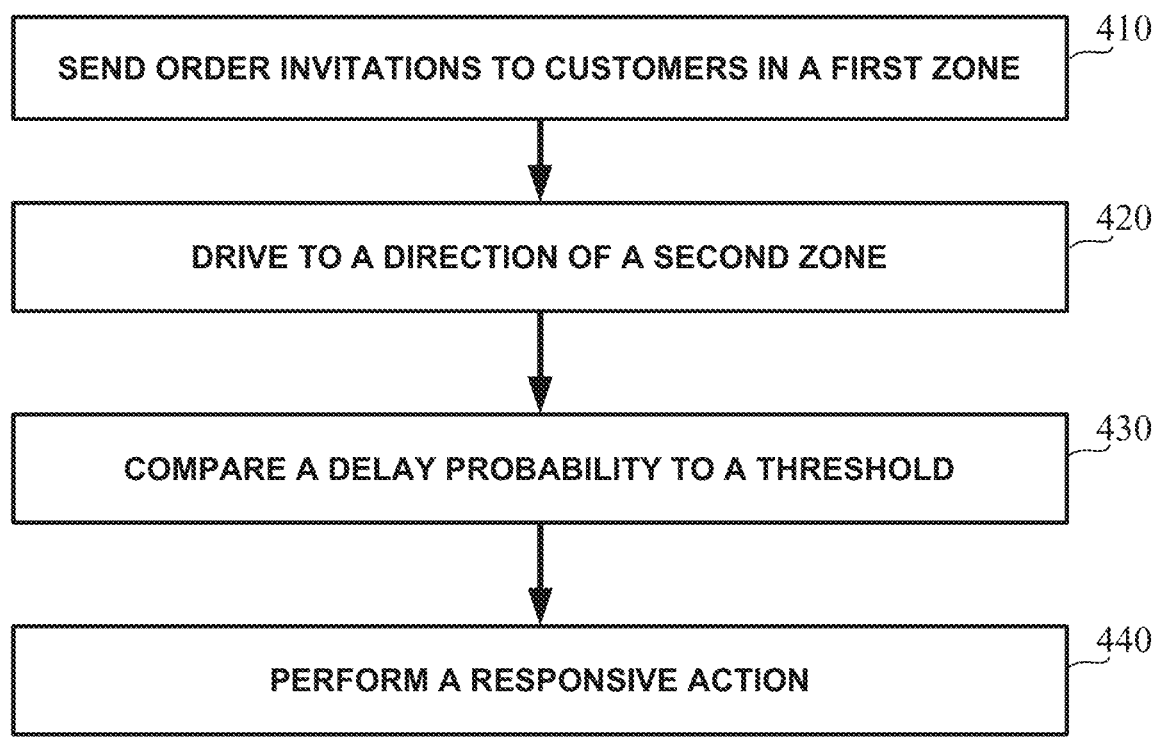
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 410, customers within a distance threshold from a retail unit may be provided with order invitations. In some exemplary embodiments, the customers may be located in a first zone, belong thereto, or the like. In some exemplary embodiments, in some cases, such as in cities that are new to the service of the retail unit, in detached zones, or the like, customers and/or customer concentrations may be located relatively far from each other within the one or more zones that are assigned to a retail unit (e.g., according to the steps of FIG. 2). For example, a city that is new to the service of the mobile retail units, may include relatively few registered customers, which may be located at detached concentrations of customers, without a detectable clear or natural route that leads from one concentration of customers to another. In some exemplary embodiments, one or more zones, such as detached zones, may be selected to be served in case their user segments match the inventory of the retail unit, and their estimated load matches a load threshold of the retail unit.

On Step 420, a driver of the retail unit may start driving in a direction of a next concentration of customers, e.g., a second zone, in case there are no more uninvited customers within the distance threshold, within a current first zone, or the like. In some exemplary embodiments, the driver may start driving after one or more timeframes have elapsed, one or more orders have been made by customer, and all of the orders have been served (e.g., by conducting appointments with the ordering customers). In other cases, the driver may start driving after one or more timeframes have elapsed, without any orders being made. In some exemplary embodiments, the driver of the retail unit may be provided with instructions to drive to a second selected zone that is remote or detached from the current zone, to a different area within the first zone that is remote or detached from the current area, or the like. In some exemplary embodiments, in order to make discrete decisions regarding determining a time to loiter in each selected zone, before moving on to a next zone, one or more calculations may be performed. Alternatively, one or more settings may define such loitering times. In some cases, the calculations may be heuristics-based, data-driven, or the like. For example, the driver may be presented with a recommendation to drive away in case a probability that any invited customer that has not yet ordered will make an order, is below a threshold.

On Step 430, delay probabilities may be calculated periodically, continuously, or the like, during the driving of the retail unit away from the first zone. In some exemplary embodiments, as the retail unit drives away from the first zone, a delay probability, indicating a probability that an invited customer from the first zone will make an order and have to wait more than a defined number of minutes (e.g., the delay threshold) for an appointment, may be continuously calculated, and compared to a tolerance threshold. For example, in case customers within 20 minutes of driving were all invited, and a next concentration of customers are located in a driving distance of 50 minutes, the delay probabilities may be calculated during the 50-minute drive, a portion thereof, or the like. In some exemplary embodiments, the delay probabilities and the tolerance threshold may be determined similarly to the description of Step 140 (FIG. 1) and Step 350 (FIG. 3).

On Step 440, in case the comparison of the delay probability and the tolerance threshold indicates that the delay probability does not comply with the tolerance threshold, one or more responsive actions may be performed, such as causing the driver to stop the drive, continue the drive to the second zone (e.g., while cancelling future appointments, expiring invitations to the customers of the first zone, or the like), return to the first zone, or the like. In some exemplary embodiments, as the driver is located further from the customers of the first zone, the delay probability may increase, as the driving distance to the customers may increase for an obtained order from the first zone. In some exemplary embodiments, in case an order is obtained from a customer of the first zone, and the retail unit is within a distance that enables it to serve the customer while complying with the delay threshold or tolerance threshold, the retail unit may drive to the customer, serve the customer, and then continue to Step 420.

In some exemplary embodiments, one or more responsive actions may be configured to be performed, in response to determining that a tolerance threshold is violated. In some exemplary embodiments, the responsive actions may comprise alerting the driver that the tolerance threshold is no longer complied with, informing the driver of estimated delays, or the like. For example, a notification may be generated and presented to the driver, enabling the driver to decide whether to continue or stop driving. In some exemplary embodiments, the driver may decide whether the retail unit should be stopped, so that potential meetings with the customers of the first zone will be enabled to be served within a delay threshold, or whether the retail unit should continue to the second zone, on the expense of losing potential orders from the first zone.

In some exemplary embodiments, the responsive actions may comprise instructing the driver to stop the driving, continue to drive to the second zone, return to the first zone, or the like, based on a calculation of a probability that the customers from the first zone will order as a function of time, and will be in a distance from the retail unit that complies with the delay threshold or tolerance threshold. For example, an ordering probability of the group of customers may be determined similarly to Step 340 (FIG. 3). In some cases, in case a number of estimated orders within a defined timeframe overpasses a threshold, the driver may be instructed to stop driving, until the probabilities decrease below the threshold. Otherwise, the driver may be instructed to continue driving to the second zone. In some exemplary embodiments, the threshold may be set to provide sufficient time for the customers of the first zone to order, which enables to assume that the retail unit can safely leave the zone with minimal chances of an order coming in from the first zone. In some cases, in addition to or instead of instructing the driver to stop or continue driving, one or more responsive actions may include controlling the retail unit from remote to stop or continue the drive, such as from a remote server.

Figure 5:
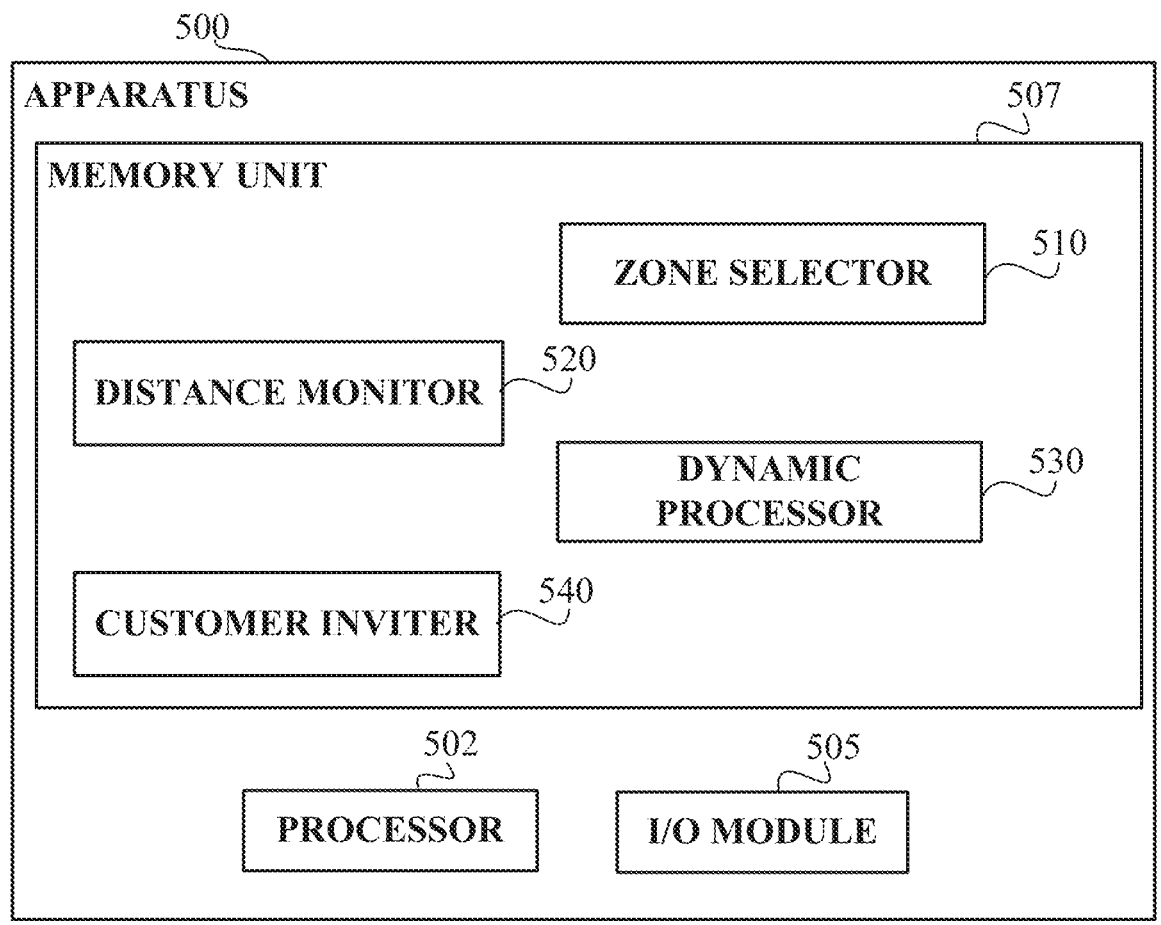
FIG. 5 shows a block diagram of an apparatus, in accordance with some exemplary embodiments of the disclosed subject matter.

Referring now to FIG. 5 showing a block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the methods of FIGS. 1-4, or the like.

In some exemplary embodiments of the disclosed subject matter, an Input/Output (I/O) Module 505 may be utilized to provide an output to and receive input from a user device, a sensor, or the like, such as from multiple mobile retail units, location devices thereon, communication devices of operators thereof, or the like. I/O Module 505 may be used to transmit and receive information to and from any apparatus in communication therewith.

In some exemplary embodiments, Apparatus 500 may comprise a Memory Unit 507. Memory Unit 507 may be a short-term storage device or long-term storage device.

Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the steps in FIGS. 1-4, or the like.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Memory Unit 507 may comprise a Zone Selector 510. Zone Selector 510 may be configured to select one or more zones for each retail unit of a set of one or more retail units. In some cases, Zone Selector 510 may select non-overlapping zones for different retail units, or overlapping zones. For example, Zone Selector 510 may select overlapping zones for retail units that match non-overlapping user segments, or user segments with low correlations. Each mobile retail unit may comprise a truck, a van, a trailer, a ship, a bus, an airplane, or the like, which may be configured to travel between different locations, homes, apartments, offices, or the like, within the selected zones selected by Zone Selector 510. Zone Selector 510 may be configured to select one or more zones similarly to Step 110 (FIG. 1).

In some exemplary embodiments, Memory Unit 507 may comprise a Distance Monitor 520. Distance Monitor 520 may be configured to monitor a distance between customers to a location of a retail unit. Distance Monitor 520 may monitor customer locations based on location signals from a plurality of computing devices obtained via I/O Module 505, based on customer-provided addresses, customer profiles, or the like. Distance Monitor 520 may compare the monitored customer locations to current locations of retail units, which may be obtained from location devices of the retail units, location devices of operators or drivers of the retail units, processed location data provided by communication devices of the retail units, or the like. Distance Monitor 520 may be configured to compare the determined distances to a distance threshold, e.g., to determine which customers are located within one or more distance thresholds.

In some exemplary embodiments, Memory Unit 507 may comprise a Dynamic Processor 530, which may be configured to dynamically accumulate one or more types of data, and determine one or more parameters, valuations thereof, or the like. Dynamic Processor 530 may be configured to obtain distance information from Distance Monitor 520, and determine delay probabilities for customers to which invites were sent Dynamic Processor 530 may compare the delay probabilities to a tolerance threshold, and, in case they comply with a tolerance threshold, Dynamic Processor 530 may increase a distance threshold, thereby enabling to invite additional customers, or enable to invite addition customers by inviting newly detected customers with or without increasing the distance threshold. In case no customers are newly detected, and the delay probabilities comply with the tolerance threshold, Dynamic Processor 530 may increase the distance threshold. In case new customers are detected, and the delay probabilities violate with the tolerance threshold, Dynamic Processor 530 may decrease the distance threshold.

In some exemplary embodiments, Memory Unit 507 may comprise a Customer Inviter 540, which may be configured to invite customers according to one or more parameters or configurations determined by Dynamic Processor 530. For example, Customer Inviter 540 may invite a first customer within a distance threshold, activate Dynamic Processor 530 to determine whether a next customer within the threshold should be invited, and so on. Customer Inviter 540 may utilize distance thresholds that are set by Dynamic Processor 530.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to be implemented at a computer processor, the method comprising:

assigning one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones;

based on the mobile retail unit being located at a location in the one or more geographical zones, detecting a first group of one or more customers within a first distance threshold from the location, said detecting is based on first geographical locations of the first group of one or more customers, the first geographical locations being indicated via a software application that is executed on first user devices of the first group of one or more customers, wherein the location of the mobile retail unit is determined by a location device of the mobile retail unit, the location device of mobile retail unit is configured to measure the location of the mobile retail unit, and send signals indicating the location of the mobile retail unit to a backend server, thereby enabling the backend server to monitor a distance between the mobile retail unit and addresses of customers in real time;

sending a first set of one or more order invitations to the first user devices, wherein the first set of one or more order invitations invites the first group of one or more customers to book a respective first set of one or more meetings, wherein during each booked meeting of the first set of one or more meetings, one or more items selected by a respective customer is presented to the respective customer;

determining to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold, wherein said determining comprises dynamically performing a comparison between the probability that the first group of one or more customers will suffer from the one or more illegitimate delays and between a tolerance threshold, wherein said determining to adjust the first distance threshold is based on the comparison;

based on said determining, increasing the first distance threshold to a second distance threshold, wherein a second group of one or more customers are detected within the second distance threshold based on second geographical locations of the second group of one or more customers, the second geographical locations indicated via the software application, wherein the first group of one or more customers excludes the second group of one or more customers; and sending a second set of one or more order invitations to the second group of one or more customers, wherein the second set of one or more order invitations invites the second group of one or more customers to book respective second set of one or more meetings, said sending comprising providing the second set of one or more order invitations to second user devices of the second group of one or more customers.

2. The method of claim 1, wherein said assigning comprises estimating that a probability of engagement of the customers from the one or more geographical zones with order invitations associated with the inventory complies with an engagement optimization criterion and with a constraint on resources of the mobile retail unit.

3. The method of claim 1, wherein the first set of one or more order invitations comprises an order invitation that enables a customer to make an order comprising at least a portion of the items from the mobile retail unit, wherein, in response to making the order that comprises the at least the portion of the items, the method comprises scheduling a meeting with the customer, wherein the meeting is comprised by the first set of one or more meetings.

4. The method of claim 1, wherein the delay probability is determined based on ordering probabilities of the first group of one or more customers, wherein the ordering probabilities are determined based on measured reactions of the first group of one or more customers to the first set of one or more order invitations via the first user devices.

5. The method of claim 1, wherein the delay probability is determined based on predicted service times for serving customers from the first group of one or more customers that are estimated, by a prediction module, to make an order.

6. The method of claim 1, wherein the delay probability is determined based on predicted driving times for driving between customers from the first group of one or more customers that are estimated to make an order.

7. The method of claim 1, wherein the delay probability is determined based on historic conversion rates of customers in view of types of customer reactions.

8. The method of claim 1, wherein, in case the tolerance threshold is not complied with after starting to perform said sending the second set of one or more order invitations to the second group of one or more customers, the method comprises terminating said sending the second set of order invitations until the tolerance threshold is complied with.

9. The method of claim 1, wherein, in case the tolerance threshold is complied with after sending the second set of one or more order invitations to the second group of one or more customers, the method comprises increasing the second distance threshold to a third distance threshold, thereby causing a third set of order invitations to be sent to a third group of one or more customers that are located within the third distance threshold from the mobile retail unit, wherein the first and second groups of one or more customers exclude the third group of one or more customers.

10. The method of claim 1, wherein said sending the second set of one or more order invitations comprises iteratively:
sending an order invitation to a single customer from the second group of one or more customers,
determining an adjusted delay probability that takes into account the single customer, and
in case the adjusted delay probability complies with the tolerance threshold, inviting a next customer from the second group of one or more customers.

11. The method of claim 1, wherein the customers from the one or more geographical zones comprise customers that have an indicated address within the one or more geographical zones.

12. The method of claim 1, wherein an order invitation of the first set of one or more order invitations is expired after an elapsed timeframe.

13. The method of claim 1 comprising causing an order invitation of the first set of one or more order invitations to become expired based on a driving route of the mobile retail unit, wherein the driving route is based on a comparison between ordering probabilities of the first group of one or more customers and a threshold.

14. An apparatus comprising a processor and coupled memory, said processor being adapted to:
assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones;
based on the mobile retail unit being located at a location in the one or more geographical zones, detect a first group of one or more customers within a first distance threshold from the location, said detect is based on first geographical locations of the first group of one or more customers, the first geographical locations being indicated via a software application that is executed on first user devices of the first group of one or more customers, wherein the location of the mobile retail unit is determined by a location device of the mobile retail unit, the location device of mobile retail unit is configured to measure the location of the mobile retail unit, and send signals indicating the location of the mobile retail unit to a backend server, thereby enabling the backend server to monitor a distance between the mobile retail unit and addresses of customers in real time;
send a first set of one or more order invitations to the first user devices, wherein the first set of one or more order invitations invites the first group of one or more customers to book a respective first set of one or more meetings, wherein during each booked meeting of the first set of one or more meetings, one or more items selected by a respective customer is presented to the respective customer;

determine to adjust the first distance threshold based on a delay probability, wherein the delay probability estimates a probability that the first group of one or more customers will suffer from one or more illegitimate delays of the first set of one or more meetings, wherein the illegitimate delays are defined based on a delay threshold, said determine comprising dynamically performing a comparison between the probability that the first group of one or more customers will suffer from the one or more illegitimate delays and between a tolerance threshold, said determining to adjust the first distance threshold is based on the comparison;

based on said determining, increase the first distance threshold to a second distance threshold, wherein a second group of one or more customers are detected within the second distance threshold based on second geographical locations of the second group of one or more customers, the second geographical locations indicated via the software application, wherein the first group of one or more customers excludes the second group of one or more customers; and send a second set of one or more order invitations to the second group of one or more customers, wherein the second set of one or more order invitations invites the second group of one or more customers to book respective second set of one or more meetings, said sending comprising providing the second set of one or more order invitations to second user devices of the second group of one or more customers.

15. An apparatus comprising a processor and coupled memory, said processor being adapted to:

assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones;

based on the mobile retail unit being located at a location in the one or more geographical zones, detect a first group of one or more customers within a first distance threshold from the location, said detecting is based on first geographical locations of the first group of one or more customers, the first geographical locations being indicated via a software application that is executed on first user devices of the first group of one or more customers, wherein the location of the mobile retail unit is determined by a location device of the mobile retail unit, the location device of mobile retail unit is configured to measure the location of the mobile retail unit, and send signals indicating the location of the mobile retail unit to a backend server, thereby enabling the backend server to monitor a distance between the mobile retail unit and addresses of customers in real time;

send a first set of one or more order invitations to the first user devices, wherein the first set of one or more order invitations invites the first group of one or more customers to book a respective first set of one or more meetings, wherein during each booked meeting of the first set of one or more meetings, one or more items selected by a respective customer is presented to the respective customer;

dynamically perform a first comparison between a probability that the first group of one or more customers will suffer from one or more illegitimate delays of the first set of one or more meetings and between a tolerance threshold;

determine to adjust the first distance threshold based on a delay probability and based on the first comparison, wherein the delay probability estimates the probability that the first group of one or more customers will suffer from the one or more illegitimate delays, wherein the illegitimate delays are defined based on a delay threshold;

based on said determining, increase the first distance threshold to a second distance threshold, wherein a second group of one or more customers are detected within the second distance threshold based on second geographical locations of the second group of one or more customers, the second geographical locations indicated via the software application, wherein the first group of one or more customers excludes the second group of one or more customers;

send a second set of one or more order invitations to the second group of one or more customers, wherein the second set of one or more order invitations invites the second group of one or more customers to book respective second set of one or more meetings, said sending comprising providing the second set of one or more order invitations to second user devices of the second group of one or more customers; and cause an order invitation of the first set of one or more order invitations to become expired based on a driving route of the mobile retail unit, wherein the driving route is based on a second comparison between ordering probabilities of the first group of one or more customers and a threshold.

16. The apparatus of claim 15, wherein said assigning comprises estimating that a probability of engagement of the customers from the one or more geographical zones with order invitations associated with the inventory complies with an engagement optimization criterion and with a constraint on resources of the mobile retail unit.

17. The apparatus of claim 15, wherein the delay probability is determined based on the ordering probabilities of the first group of one or more customers, wherein the ordering probabilities are determined based on measured reactions of the first group of one or more customers to the first set of one or more order invitations.

18. The apparatus of claim 15, wherein, in case the tolerance threshold is not complied with after starting to perform said sending the second set of one or more order invitations to the second group of one or more customers, the processor is further adapted to terminate said sending the second set of order invitations until the tolerance threshold is complied with.

19. A computer program product comprising a non-transitory computer readable storage medium retaining program instructions, which program instructions, when read by a processor, cause the processor to:

assign one or more geographical zones to a mobile retail unit, wherein said assigning is based on first user segments of customers from the one or more geographical zones, wherein said assigning is based on second user segments associated to an inventory of the mobile retail unit, wherein the mobile retail unit is configured to serve customers from assigned geographical zones;

based on the mobile retail unit being located at a location in the one or more geographical zones, detect a first group of one or more customers within a first distance threshold from the location, said detecting is based on first geographical locations of the first group of one or more customers, the first geographical locations being indicated via a software application that is executed on first user devices of the first group of one or more customers, wherein the location of the mobile retail unit is determined by a location device of the mobile retail unit, the location device of mobile retail unit is configured to measure the location of the mobile retail unit, and send signals indicating the location of the mobile retail unit to a backend server, thereby enabling the backend server to monitor a distance between the mobile retail unit and addresses of customers in real time;

send a first set of one or more order invitations to the first user devices, wherein the first set of one or more order invitations invites the first group of one or more customers to book a respective first set of one or more meetings, wherein during each booked meeting of the first set of one or more meetings, one or more items selected by a respective customer is presented to the respective customer;

dynamically perform a first comparison between a probability that the first group of one or more customers will suffer from one or more illegitimate delays of the first set of one or more meetings and between a tolerance threshold;

determine to adjust the first distance threshold based on a delay probability and based on the first comparison, wherein the delay probability estimates the probability that the first group of one or more customers will suffer from the one or more illegitimate delays, wherein the illegitimate delays are defined based on a delay threshold;

based on said determining, increase the first distance threshold to a second distance threshold, wherein a second group of one or more customers are detected within the second distance threshold based on second geographical locations of the second group of one or more customers, the second geographical locations indicated via the software application, wherein the first group of one or more customers excludes the second group of one or more customers;

send a second set of one or more order invitations to the second group of one or more customers, wherein the second set of one or more order invitations invites the second group of one or more customers to book respective second set of one or more meetings, said sending comprising providing the second set of one or more order invitations to second user devices of the second group of one or more customers; and cause an order invitation of the first set of one or more order invitations to become expired based on a driving route of the mobile retail unit, wherein the driving route is based on a comparison between ordering probabilities of the first group of one or more customers and a threshold.

* * * * *